United States Patent [19]

Uemura et al.

[11] Patent Number: 5,483,453
[45] Date of Patent: Jan. 9, 1996

[54] NAVIGATION CONTROL SYSTEM WITH ADAPTIVE CHARACTERISTICS

[75] Inventors: Hiroki Uemura; Tetsuro Butsuen; Tohru Yoshioka; Ayumu Doi; Kenichi Okuda; Yasunori Yamamoto; Tomohiko Adachi; Naotsugu Masuda, all of Hiroshima, Japan

[73] Assignee: Mazda Motor Corporation, Japan

[21] Appl. No.: 50,560

[22] Filed: Apr. 20, 1993

[30] Foreign Application Priority Data

Apr. 20, 1992 [JP] Japan .................................. 4-099818
Sep. 29, 1992 [JP] Japan .................................. 4-259847

[51] Int. Cl.⁶ .......................... G06F 165/00; G05D 1/02; B62D 1/02
[52] U.S. Cl. .................... 364/424.02; 364/443; 364/447; 364/460; 318/587; 180/179
[58] Field of Search .......................... 364/424.02, 443, 364/447, 460, 461; 318/587; 180/167, 168, 169, 179; 367/909

[56] References Cited

U.S. PATENT DOCUMENTS

| | | | |
|---|---|---|---|
| 4,802,096 | 1/1989 | Hainsworth et al. | 364/461 |
| 4,809,178 | 2/1989 | Ninomiya et al. | 364/461 |
| 4,970,509 | 11/1990 | Kissinger, Sr. | 364/460 |
| 5,155,426 | 10/1992 | Kurami | 364/424.02 |
| 5,172,315 | 12/1992 | Asanuma et al. | 364/424.02 |
| 5,233,527 | 8/1993 | Shinnosuke | 364/424.02 |
| 5,245,422 | 9/1993 | Boreherts et al. | 364/424.02 |
| 5,249,128 | 9/1993 | Markandey et al. | 364/426.04 |
| 5,357,432 | 10/1994 | Margolis et al. | 364/424.02 |
| 5,367,457 | 11/1994 | Ishida | 364/424.02 |
| 5,377,106 | 12/1994 | Drunk et al. | 364/424.02 |
| 5,390,118 | 2/1995 | Margolis et al. | 364/424.02 |
| 5,416,477 | 5/1995 | Shibata | 364/443 |

FOREIGN PATENT DOCUMENTS 63-214900  9/1988  Japan .
2-270005  11/1990  Japan .

Primary Examiner—Kevin J. Teska
Assistant Examiner—Tyrone V. Walker
Attorney, Agent, or Firm—Fish & Richardson

[57] ABSTRACT

When the vehicle has deviated or is deviating from a lane on which the vehicle has been or is running, the deviation of the vehicle from the lane can be suppressed, for example, by allowing the steering wheel to be operatively rotated prior to an intention of the operator. The timing of suppressing the deviation of the vehicle can be altered in accordance with conditions including, for example, the existence of a lane in the direction of deviation of the vehicle on which another vehicle is running in the same direction, the existence of an obstacle in the direction of deviation of the vehicle, the existence of an adjacent lane in the direction of deviation of the vehicle on which another vehicle is running in the opposite direction, a state of the lane on which the vehicle is running, such as a curved lane or a straight lane, a direction of deviation is outside or inside the curved lane or a lane width, a vehicle speed, a steering angle of a steering wheel, an extent of vision, and so on.

37 Claims, 15 Drawing Sheets

NAVIGATION CONTROL SYSTEM WITH ADAPTIVE CHARACTERISTICS

BACKGROUND OF THE INVENTION

1. Field of the Invention

The present invention relates to a navigation control system for an automotive vehicle and, more particularly, to a navigation control system for an automotive vehicle, having a deviation suppressing means so adapted as to return the vehicle to its original lane on which the vehicle is running, when the vehicle has been deviated from its original lane, or as to allow the vehicle to hold its original or current lane when it is deviating therefrom.

2. Description of the Related Art

Heretofore, automotive vehicles have been equipped with seat belts and air bags in order to ensure safety of passengers. Further, devices for preventing an accident from occurring have been developed. As described in Japanese Patent Laid-open Publication (kokai) No. 63214,900, for example, it is known a device for giving an alarm to the operator when the automotive vehicle has been deviated from its given lane without steering which is effected under conscious control by the operator.

Further, Japanese Patent Laid-open Publication (kokai) No. 2-270,005 discloses a navigation control system having an image pick-up unit for reading a guide line partitioning lanes of a road, such as a center line, a white line or the like, and an image processing unit for processing signals from the image pick-up unit, the navigation control system being adapted to control the body of the automotive vehicle so as to run in a given position on the lane of the road defined and delimited between the guide lines indicated on the road.

These conventional techniques, however, do not take into account the timing of operating the action to hold the vehicle at its original lane or to return the vehicle to its original lane, when the vehicle running on the lane has gone beyond one of the guide lines on the lane and deviated from the lane into the adjacent lane or when it is going or about to go beyond the adjacent guide line. Hence, for instance, if the navigation control system as described in Japanese Patent Laid-open Publication No. 2-27,000 would be so arranged as to uniformly operate the action for correcting the steering of the vehicle at an earlier timing, it is preferred that the situation in which the vehicle is deviating from the current lane can be suppressed, whereas it is disadvantageous that the early timing of operating the action to correct the steering of the vehicle may give rise to a feeling of unpleasantness because the action to correct the steering of the vehicle should be carried out at a high frequency. On the other hand, if the action to correct the steering of the vehicle is to be uniformly carried out at a later timing, the conventional navigation control system suffers from the disadvantage that the action of the vehicle to deviate from the lane on which the vehicle is running cannot be suppressed to a sufficient extent, although a frequency of operating the action to correct the steering of the vehicle is reduced to thereby ensure a feeling of comfortableness.

SUMMARY OF THE INVENTION

Therefore, the object of the present invention is to provide a navigation control system for an automotive vehicle so adapted as to be capable of suppressing the vehicle from deviating from the lane on which the vehicle is running and holding the vehicle at the current lane as well as capable of preventing the control of suppressing the deviation of the vehicle from its original lane from being carried out at a high frequency.

In order to achieve the aforesaid object, the present invention consists of a navigation control system for an automotive vehicle, which comprises:

deviation suppressing means for suppressing deviation of the vehicle from the lane of a road, when the vehicle has deviated from the lane into an adjacent lane or when the vehicle is going to deviate from the lane;

detection means for detecting a predetermined condition affecting the deviation of the vehicle from the lane; and control means for altering a timing of operating said deviation suppressing means in accordance with said predetermined condition to be detected by said detection means.

The navigation control system having the configuration as described hereinabove can alter the timing of operating the deviation suppressing means in accordance with the predetermined condition to always make the operating timing optimal or nearly optimal, thereby suppressing the vehicle from deviating from the current lane on which the vehicle is currently running and suppressing the control of suppressing the deviation of the vehicle from being carried out too frequently to thereby prevent the occurrence of the situation that provides the passenger with a feeling of unpleasantness.

For the navigation control system according to the present invention, a variety of the conditions for altering the timing for operating the deviation suppressing means can be set. They may include, for example, the position of the vehicle on the road on which the vehicle is running, the presence or absence of a vehicle running behind, a state of a road on which the vehicle is running, a factor affecting the likelihood of the vehicle to deviate from the lane on which the vehicle is running, a factor affecting stability in navigation of the vehicle, a factor indicative of an extent to which the vehicle is approaching to another vehicle or the another vehicle is approaching to the vehicle, a factor affecting a vision of the passenger, and so on.

More specifically, the position of the vehicle on a lane of the road on which the vehicle is currently running, particularly the position of the vehicle located in the longitudinal direction of the lane of the road (i.e. the longitudinal position of the vehicle on the lane), may affect the action to alter the timing of operating the deviation suppressing means for suppressing the vehicle from suppressing from its current or original lane on which the vehicle is or has been running. The timing of carrying out the action to alter the timing of operating the deviation suppressing means may be changed in accordance with the state of the road on which the vehicle is running. In other words, the timing of operating the deviation suppressing means may differ from the state of the road in which there is no adjacent lane on the road in the direction in which the vehicle is deviating or from the state of the road in which there is another lane adjacent to the current lane on which the vehicle is running. The timing of operating the deviation suppressing means can be set earlier when the road has the adjacent lane in the direction of deviation of the vehicle than when the road has no adjacent lane in the direction of deviation thereof. If there is no adjacent lane on the road in the direction in which the vehicle is deviating, there should be an obstacle, such as a road shoulder, wall, guard rail, and so on, or another lane on which vehicles are running in the opposite direction, on the side of the current lane on which the vehicle is deviating.

Further, the timing of operating the deviation suppressing means may vary with the situation in which there is a lane adjacent to the current lane in the direction of deviation of the vehicle, and the vehicle is currently running, and another vehicle is running on the adjacent lane or is not running on the adjacent lane. If the vehicle is deviating from its current lane into the adjacent lane and another vehicle on the adjacent lane is running ahead or behind the deviating vehicle, the deviation of the vehicle should be suppressed at the timing earlier when another vehicle is running on the adjacent lane in the position closer to the deviating vehicle than when there is no vehicle running on the adjacent lane.

In addition, the state of the road on which the vehicle is running, that is, whether the road is curved or straight, can affect the action to alter the timing of operating the deviation suppressing means. The timing of operating the deviation suppressing means may be set earlier when the road is curved than when the road is straight. Further, whether the vehicle is deviating in the direction outside or inside the curved road can affect the action to alter the timing of operating the deviation suppressing means. If the vehicle is deviating outside the curved lane, the timing of operating the deviation suppressing means may be set earlier than when the vehicle is deviating inside the curved lane. Furthermore, a lane width of the lane on which the vehicle is running should be taken into account as the condition for altering the timing of operating the deviation suppressing means. The timing of operating the deviation suppressing means may be set earlier when the lane width is wider than when the lane width is narrower.

Further, as the other conditions for altering the timing of operating the deviation suppressing means, there may be illustrated a variety of the factors as described hereinabove, including the factor affecting the likelihood of the vehicle to deviate from the lane on which the vehicle is running, such as, for example, a vehicle speed, a steering angle of a steering wheel, and so on; the factor affecting stability in navigation of the vehicle, such as, for example, a road surface friction coefficient $\mu$, an angle at which an accelerator is open, an amount in which the brake is operated, and so on; the factor indicative of an extent to which the vehicle is approaching to another vehicle, such as, for example, a distance between two vehicles, and so on; and the factor affecting the vision of the passenger, such as, for example, a day time, a night time, or the presence or absence of fog.

In addition to those conditions as affecting the action to alter the timing of operating the deviation suppressing means, further conditions may be set: they include, for example, a state in which the suppression of the deviation is strongly required and a state in which the suppression of the deviation is not so strongly required. In the state in which the suppression of the deviation of the vehicle is strongly required, an addition of these conditions can serve as controlling the deviation of the vehicle with high certainty. On the other hand, in the state in which the suppression of the deviation of the vehicle is not so strongly required, the condition as described hereinabove can help preventing the situation in which the deviation of the vehicle is forcibly controlled.

Other objects, features and advantages of the present invention will become apparent in the course of the description of the present invention, with reference to the accompanying drawings.

DESCRIPTION OF THE PREFERRED EMBODIMENTS

The present invention will be described in more detail by way of examples with reference to the accompanying drawings.

A description will be made of a first embodiment of the navigation control system according to the present invention with reference to FIGS. 1 to 8.

Figure 1:
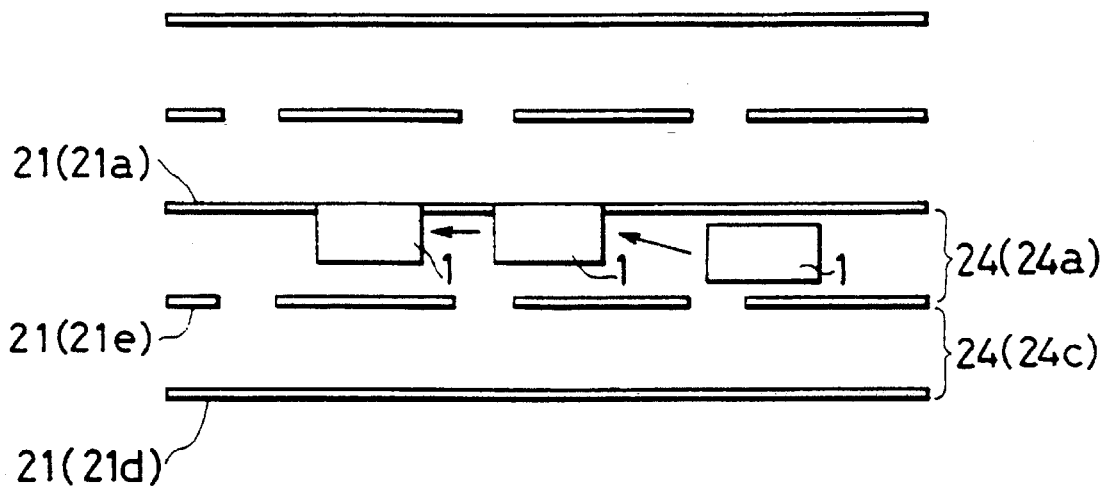
FIG. 1(a) is a schematic representation showing the instance of correcting the steering of the vehicle so as to allow the vehicle deviated from its middle course to run on a course of the lane close to the center line of the road.
FIG. 1(b) is a schematic representation showing the instance of correcting the steering of the vehicle running on a course of the lane close to the shoulder of the road.
Figure 1:
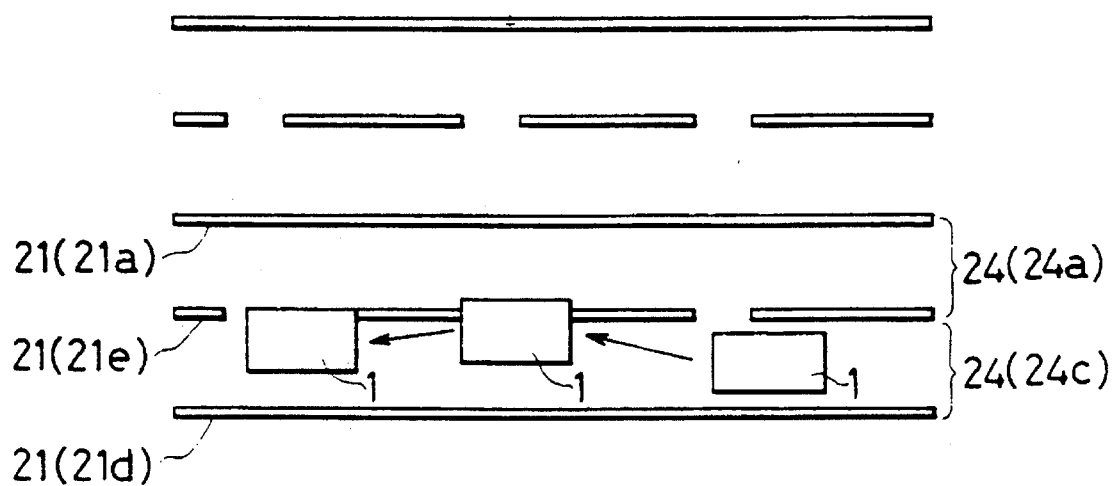
Figure 2:
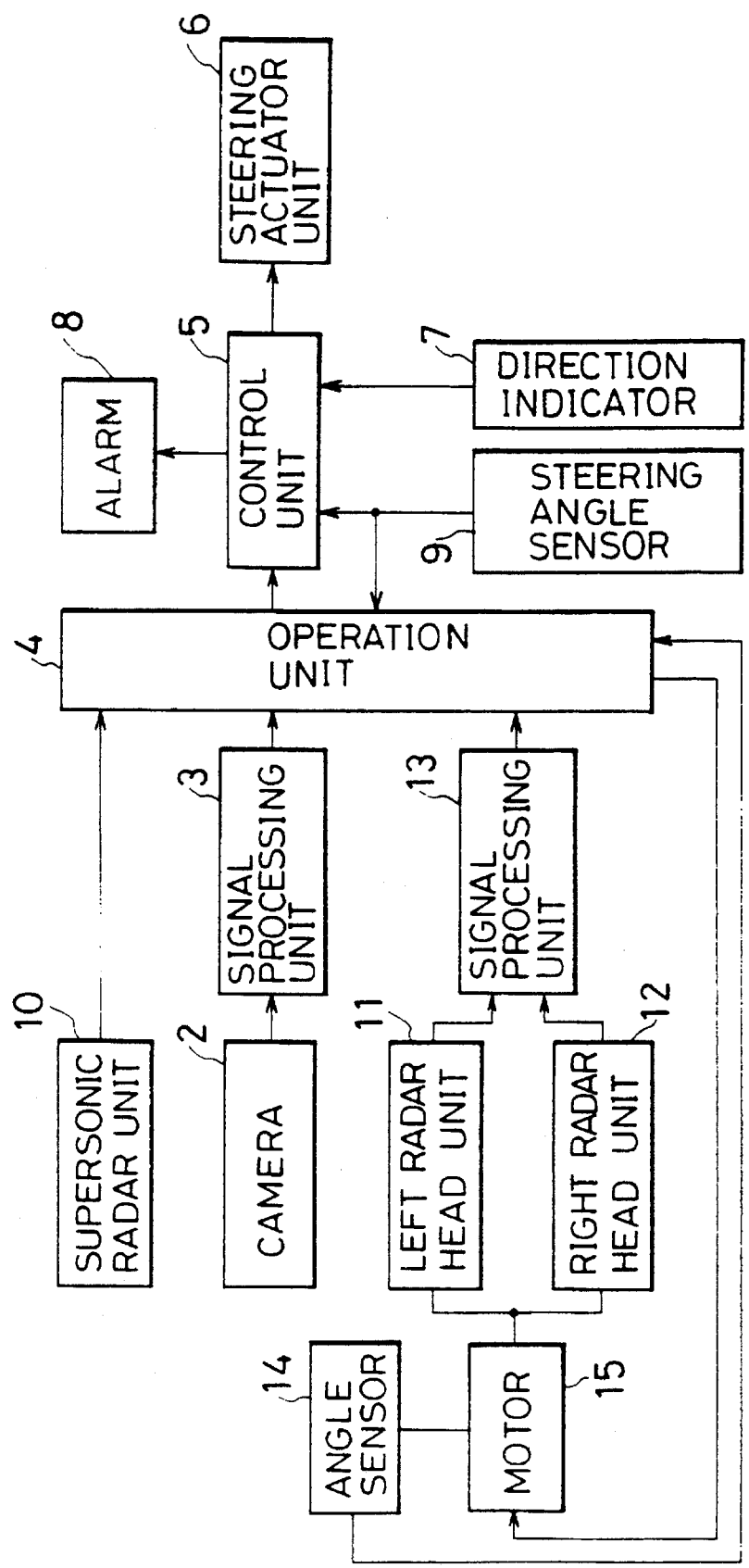
FIG. 2 is a block diagram showing the configuration of the navigation control system for performing the correction of the steering of the vehicle.
Figure 3:
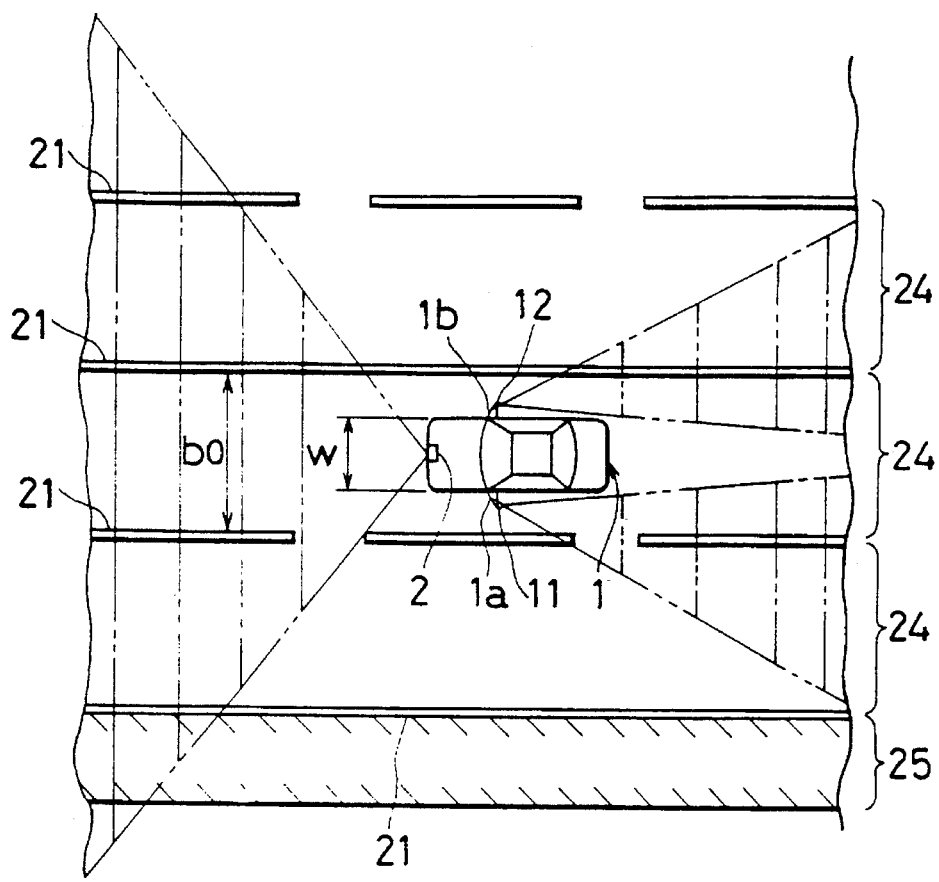
FIG. 3 is a schematic representation showing a vehicle having the navigation control system as described hereinabove and an outline of a road on which the vehicle is running.

The navigation control system for the automotive vehicle according to the first embodiment of the present invention is constituted by the elements as shown in FIG. 2. A camera 2 is mounted to a front end face of the body 1 of the vehicle and connected with an operation unit 4 through a signal processing unit 3. As shown in FIG. 3, the camera 2 is arranged to pick up guide lines, as generally indicated by reference numeral 23, drawn or formed on a road, a lane 24 extending in a forward direction and delimited between a pair of the guide lines 23 which exist before the running vehicle, other lanes extending forwards, as generally indicated by reference numeral 24, other vehicles running ahead on the road, a pedestrian walkway 25, a lane-separating zone or line, guard rails, and so on. Image signals generated from the camera 2 are processed with the signal processing unit 3 into signals to be processible with the operation unit 4, followed by entering into the operation unit 4. The operation unit 4 can compute a current position $y_0$ of the vehicle 1 running on the lane 24, an estimated position $y_1$ of the vehicle 1 in which the vehicle 1 will be running in a predetermined time after the time when the current position of the vehicle 1 has been detected, a target position $y_2$ of the vehicle 1, a transversely moving velocity $V_y$ of the vehicle 1 at which the vehicle 1 is moving in a transverse direction on the lane 24, a lane width $b_0$ of the lane 24, and so on, on the basis of the input signals entered from the signal processing unit 3, in a manner as will be described hereinafter. In addition, the operation unit 4 can recognize the lane 24 on which the vehicle 1 is running and the number of lanes 24 that extend parallel to the lane 24 on which the vehicle 1 is running as well as a direction in which the vehicle 1 is deviating from its original position or lane. In accordance with the first embodiment of the present invention, the camera 2, the signal processing unit 3 and the operation unit 4 constitute lane-position detecting means for detecting the position of the vehicle 1 on the lane on which the vehicle 1 is running and direction detecting means for detecting the direction in which the vehicle 1 is deviating from its original position on the lane 24.

The body of the vehicle 1 is provided at its front end face with a forward-detection supersonic radar unit 10 (not shown in FIG. 3) for detecting the forward direction of the lane 24 in which the vehicle 1 is running. The supersonic radar unit 10 is arranged to transmit supersonic waves and receive waves reflected from an obstacle existing ahead in the direction in which the vehicle 1 is running. Hence, the supersonic radar unit 10 comprises a transmission section from which the supersonic waves are transmitted in the forward direction and a receiving section that can receive the supersonic waves reflected from the obstacle existing in the forward direction in which the vehicle 1 is running, such as cars running ahead in the same direction and running in the opposite direction, the lane-separating zone, the guard rails, and so on. Further, the operation unit 4 can compute a distance between the vehicle 1 and the obstacle existing in the forward position and a relative velocity of the vehicle 1 relative to the obstacle including other cars running ahead, in addition to the existence of the obstacle before the vehicle 1, on the basis of the input from the signal processing unit 3. Hence, the operation unit 4 can distinguish the front obstacles, such as the cars running in the forward direction or in the opposite direction, the lane-separating zones, guard rails, and so on from others. In other words, the camera 2, the signal processing unit 3, the operation unit 4, and the supersonic radar unit 10 constitute obstacle detecting means for detecting the obstacle existing in the direction or position in which the vehicle 1 is moving towards the front. It can be noted herein that the front obstacles can also be distinguished only by the input from the signal processing unit 3.

Further, the body of vehicle 1 is provided with a left radar head unit 11 and a right radar head unit 12 at its left-hand door mirror 1a and right-hand door mirror 1b, for example, respectively, as shown in FIG. 3. Each of the radar head units 11 and 12 is so arranged as to transmit radar waves towards the rear of the vehicle 1 and to receive the radar waves reflected from an obstacle existing in the rearward direction or position. Hence, each of the radar head units 11 and 12 comprises a transmission section for transmitting the radar waves towards the rear and a receiving section for receiving the radar waves reflected from the obstacle existing in the rearward direction or position. The radar waves reflected from the rear obstacle are received by the receiving section of the radar head unit 11 or 12 and then transmitted as signals to a signal processing unit 13 that processes the signals into signals which can be processed by the operation unit 4. The operation unit 4 can compute the distance between the vehicle 1 and other cars running behind the vehicle 1 and a relative velocity of the other car with respect to the vehicle 1 on the basis of the period of time required for receiving the reflected radar waves from the transmission of the radar waves. Hence, the left-hand and right-hand radar head units 11 and 12, the signal processing unit 13, and the operation unit 4 constitute rear-vehicle detecting means for detecting the other vehicle running behind the vehicle 1.

The direction in which the radar waves are to be transmitted from and to be received by the left-hand and right-hand radar head units 11 and 12 can be changed by driving the left-hand and right-hand radar head units 11 and 12 by a motor 15 that in turn is controlled by the operation unit 4. An angle sensor 14 is so disposed as to detect the direction of transmitting and receiving the radar waves on the basis of the angle of rotation of the motor 15. The operation unit 4 can compute the distance between the vehicle 1 and the car running behind the vehicle 1 and the relative velocity of the vehicle 1 with respect to the car running behind the vehicle 1 while considering the direction of transmission and receipt of the radar waves to be detected by the angle sensor 14.

The control signals are generated from the operation unit 4 to a control unit 5 that can control operations of a steering actuator unit 6 and an alarm 8 on the basis of the operation results obtained from the operation unit 4, the input from a steering angle sensor 9, and an operation of a direction indicator 7, in such a manner as will be described hereinafter.

The steering angle sensor 9 is so adapted as to sense a steering angle, and the steering actuator unit 6 is so adapted as to alter the steering angle. The alarm 8 is disposed in an instrument panel mounted within a cabin of the body to thereby give an alarm to the operator.

When the operation unit 4 is arranged to detect an extent of deviation of the body of the vehicle 1 from a guide line 21, the current position $y_0$ of the vehicle 1 on the lane 24 and a transversely moving velocity $V_y$ of the vehicle 1 are detected and the estimated position $y_1$ of the vehicle 1 is computed from the formula: $y_1=y_0+ V_y \times T_1$. Whether the vehicle 1 is deviating from the guide line 21 can be determined by the operation unit 4 on the basis of the estimated position $y_1$ of the vehicle 1. When the deviation of the vehicle 1 from the guide line 21 is detected by the operation unit 4, the control unit 5 is so adapted as to correct the steering of the steering actuator unit 6 in order to avoid the deviation of the vehicle 1 from the guide line 21 or to return the vehicle 1 deviated from the guide line 21 to the original lane 24 on which the vehicle 1 has been running.

As is apparent from the above-mentioned formula, the estimated position $y_1$ of the vehicle 1 is so set as to vary with a set value $T_1$. When the set value $T_1$ is set to a larger value, the estimated position $y_1$ becomes a value which indicates that the vehicle 1 is deviated to a larger extent; hence, the timing at which the steering is to be corrected by the control unit 5 is set to become earlier. Therefore, the navigation control system according to the present invention is basically so arranged as to set the set value $T_1$ individually for each of the lanes 24 in accordance with the lane 24 on which the vehicle 1 is currently running, thereby altering the operating timing of correcting the steering of the steering actuator unit 6.

Figure 4:
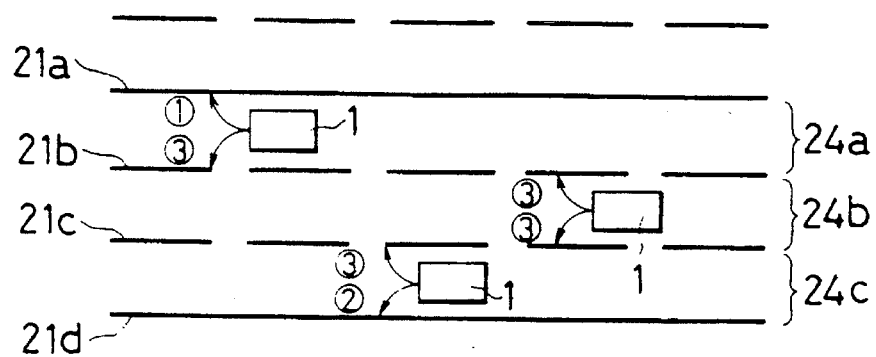
FIG. 4 is a schematic representation showing the instances in which each of three vehicles is deviating from the lane on a three-lane road on each of which a vehicle is running.

A description will now be made of the procedure for setting the set value $T_1$. As shown in FIG. 4, a road is provided with three running lanes, as indicated by reference symbols 24a, 24b, and 24c, for example, which extend parallel to each other and on which cars are running in the same direction. It can be noted herein that an emergency rating for correcting the steering should be varied with the lane on which the vehicle 1 is running and the direction in which the vehicle 1 is deviating on the lane, so that the set value $T_1$ is set to $T_{10}$, $T_{11}$, and $T_{12}$, in accordance with the cases as will be described hereinafter.

(1) The set value $T_1$ may be set to $T_{10}$ when the vehicle 1 is running on the right side end lane 24a and it is deviating from a center line 21a positioned at the right-hand side of the guide line 21.

(2) The set value $T_1$ may be set to $T_{10}$ when the vehicle 1 is running on the left side end lane 24c and it is deviating from the left-hand side guide line 21d towards the shoulder of a road.

(3) The set value $T_1$ may be set to $T_{12}$ when the vehicle 1 is deviating in the instances other than the instances (1) and (2) as described hereinabove.

In these cases, the set values $T_{10}$, $T_{11}$, and $T_{12}$ are so set as to satisfy the relationships as follows: $T_{10} > T_{12}$ and $T_{11} > T_{12}$, in which the relationship between the set values $T_{10}$ and $T_{11}$ may conveniently vary with situations.

In each of the cases (1), (2), and (3) as described hereinabove, the set value $T_1$ may be set in accordance with conditions as follows:

(1a) The set value $T_1$ may be set to $T_{13}$ when a car is running on a lane in the direction opposite to the direction in which the vehicle 1 is running on a different lane.

(1b) The set value $T_1$ may be set to $T_{10}$ when no car is running in the direction opposite to the direction in which the vehicle 1 is running.

(1c) The set value $T_1$ may be set to $T_{14}$ when there is a lane-separating zone that separates the lane on which the vehicle 1 is running from the different lane on which cars are running in the opposite direction.

It should be noted in the conditions (1a) through (1c) as described hereinabove that the relationship among the set values $T_{10}$, $T_{13}$, and $T_{14}$ are set as follows: $T_{13} > T_{14} > T_{10}$).

(2a) The set value $T_1$ may be set to $T_{11}$ when there is an obstacle such as a guard rail or the like upon which the vehicle 1 may be crashed.

(2b) The set value $T_1$ may be set to $T_{11}$ when there is no such an obstacle as in the condition (2a) above.

(2c) The set value $T_1$ may be set to $T_{16}$ when there is a pedestrian walkway.

(2d) The set value $T_1$ may be set to $T_{11}$ when there is no such a pedestrian walkway as in the condition (2c) above.

(2e) The set value $T_1$ may be set to $T_{17}$ when there is a branch lane turned to the left, such as a crossing.

(2f) The set value $T_1$ may be set to $T_{11}$ when there is no such a branch lane turned to the left, such as a crossing.

In the conditions (2a) through (2f) as described hereinabove, the relationship can be set to satisfy as follows: $T_{15} > T_6 > T_{10} > T_{11} > T_7$.

(3a) The set value $T_1$ may be set to $T_{18}$ when there is a car running behind the vehicle 1 on the running lane 24a or 24c in the direction of which the vehicle 1 is deviating.

(3b) The set value $T_1$ may be set to $T_{12}$ when there is no car running behind the vehicle 1 on the running lane 24a or 24c parallel to the direction in which the vehicle 1 is running.

In the cases (3a) and (3b) as described hereinabove, the relationship can be set to satisfy the relationship as follows: $T_{18} > T_{12}$ or $T_{18} \approx T_{16}$.

Then, a description will be made of the operations of the navigation control system in the conditions as described hereinabove, with reference to the flowcharts as shown in FIGS. 5 to 8.

Figure 5:
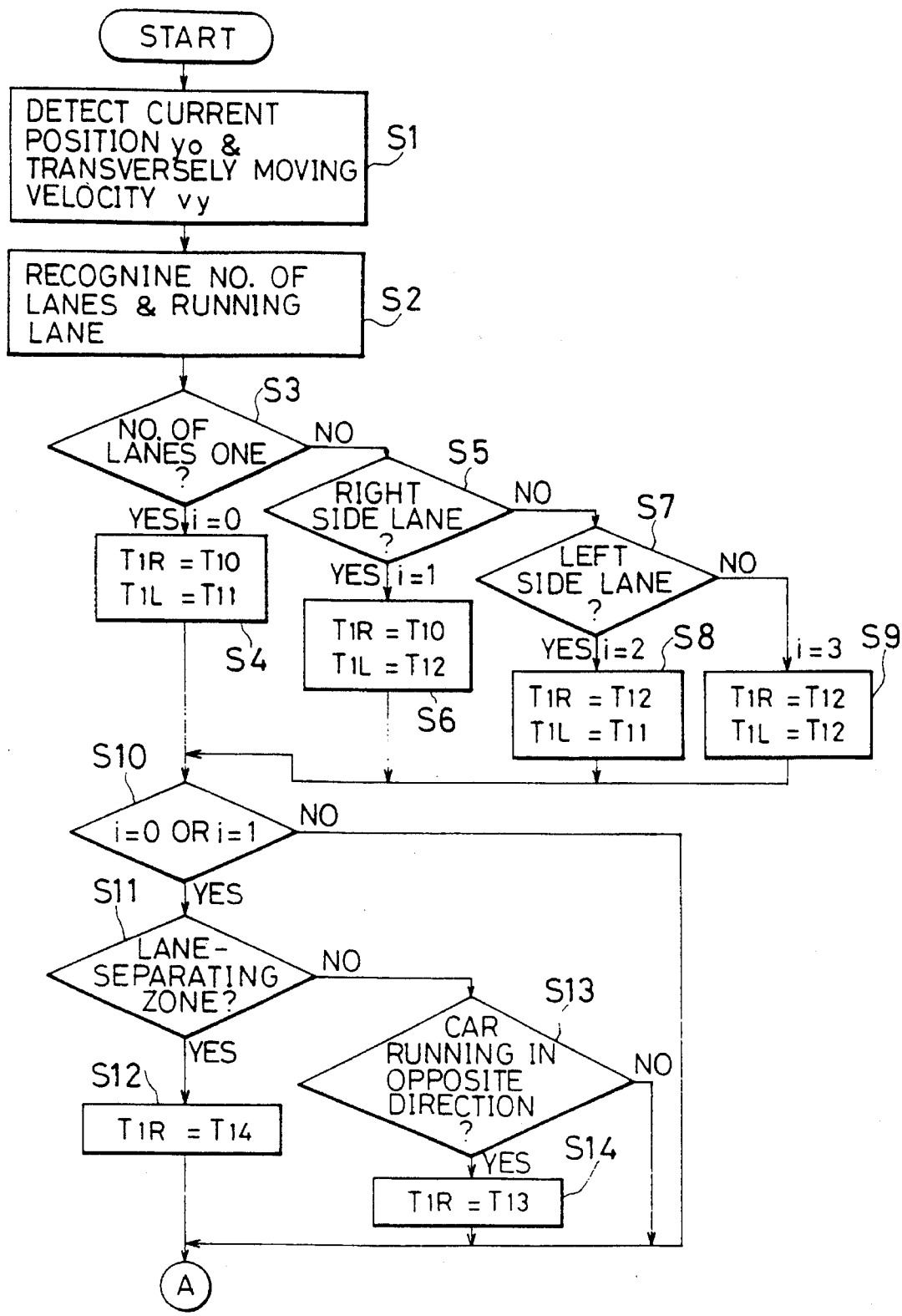
FIGS. 5 to 8 are a flow chart showing the operations of the navigation control system as described hereinabove.

As shown in FIG. 5, first, at step S1, the current transverse position $y_0$ of the vehicle 1 running on the lane 24 and the transversely moving velocity $v_y$ thereof are detected. More specifically, as shown in FIG. 3, in this detection operations, there is read a width between the guide line 21 and the opposite guide line 21, that is, a lane width $b_0$ of the lane 24 on which the vehicle 1 is running, and there is detected the current position $y_0$ of the vehicle 1 in the direction of the lane width $b_0$ from the left guide line 21. The transversely moving velocity $v_y$ of the vehicle 1 can be computed by differentiating the transverse positions $y_0$ of the vehicle 1.

The program flow then goes to step S2 at which the operation unit 4 recognizes the lane 24 on which the vehicle 1 is running and the number of the lanes 24 on which vehicles are running in the same direction. The operation at step S2 corresponds to the operation by the means for detecting the position of the lane of the vehicle 1 in the operation unit 4.

Then, at step S3, it is decided to determine if the number of the lanes is one. When the result of decision at step S3 indicates that the number of the lanes is one, on the one hand, then the program flow goes to step S4 at which a set value i, indicative of the lane 24 on which the vehicle 1 is running, is set to i=0, a set value $T_{1R}$, indicative of an extent of deviation towards the right from the lane 24 on which the vehicle 1 is running, is set to $T_{1R}=T_{10}$, and a set value $T_{1L}$, indicative of a deviation towards the left from the lane 24, is set to $T_{1L}=T_{11}$. Then, the program flow proceeds to step S10.

When it is decided at step S3 that the number of the lanes is not one, on the other hand, then the program flow goes to step S5 at which a decision is further made to determine if the vehicle 1 is running on the right side end lane 24a, for example, as shown in FIG. 4. When the result of decision at step S5 indicates that the vehicle 1 is running on the right side end lane 24a, then the program flow goes to step S6 at which the set value i is set to i=1, the set value $T_{1R}$ is set to $T_{1R}=T_{10}$, and the set value $T_{1L}$ is set to $T_{1L}=T_{12}$, followed by proceeding to step S10.

On the other hand, when the decision at step S5 gives the negative result, then the program flow goes to step S7 at which a decision is made to determine if the vehicle 1 is running on the left side end lane 24c, for example, as shown in FIG. 4. If the decision at step S7 gives the affirmative result, then the program flow goes to step S8 at which the set value i is set to i=2, the set value $T_{1R}$ is set to $T_{1R}=T_{12}$, and the set value $T_{1L}$ is set to $T_{1L}=T_{11}$, followed by proceeding to step S10.

If it is decided at step S7 that the vehicle 1 is not running on the left side end lane 24c and that it is running on the middle lane 24b, then at step S9, the set value i is set to i=3, the set value $T_{1R}$ is set to $T_{1R}=T_{12}$, and the set value $T_{1L}$ is set to $T_{1L}=T_{12}$, followed by proceeding to step S10.

Figure 6:
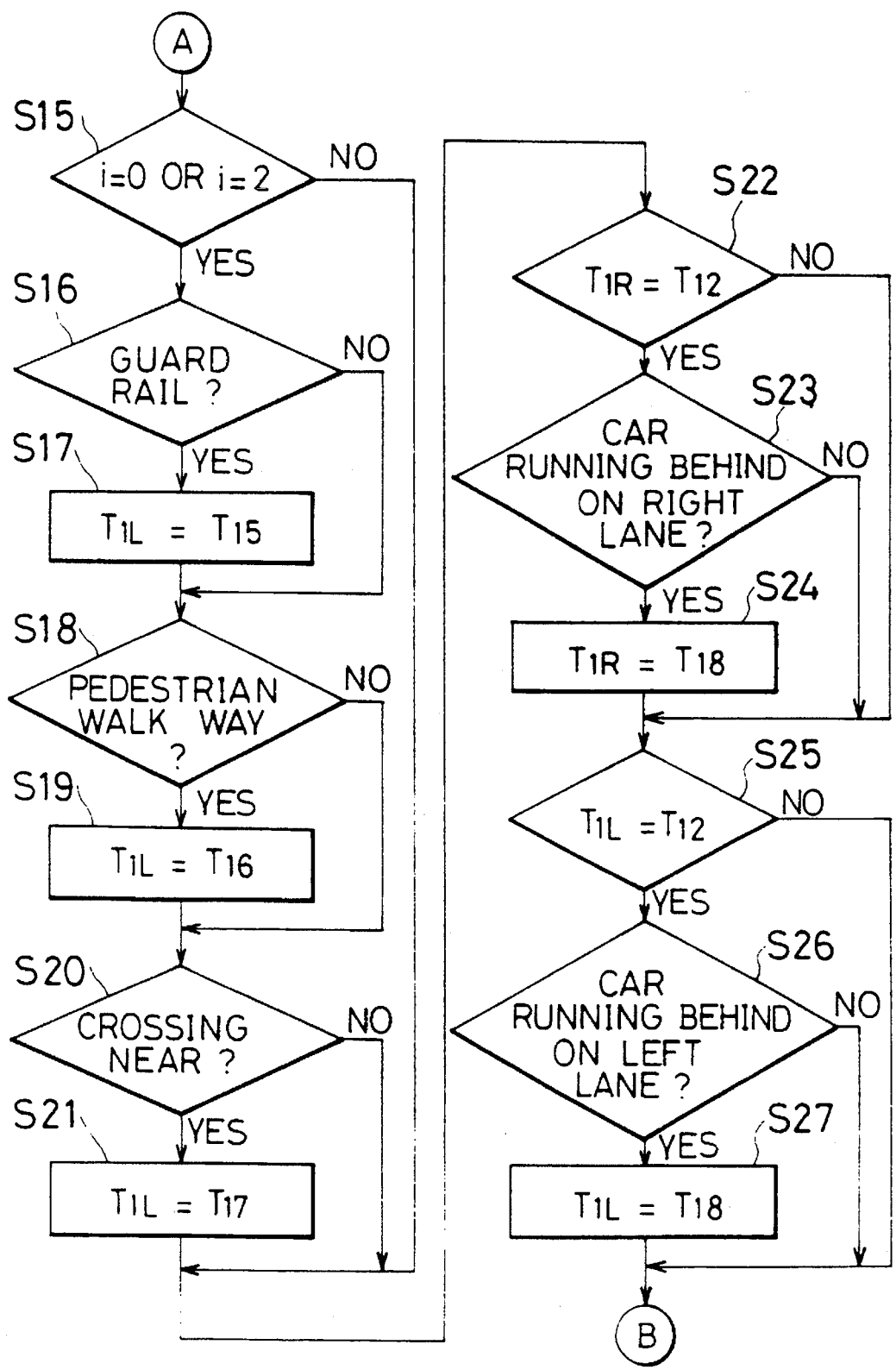

Then, at step S10, a decision is made to determine if the set value i is i=0 or i=1, that is, if the road has only one lane 24 on which the vehicle 1 is running or if the vehicle 1 is running on the right side end lane 24a, for example, as shown in FIG. 4. If the decision at step S10 gives the affirmative result, on the one hand, then the program flow goes to step S15 as shown in FIG. 6. If the decision at step S10 gives the negative result, on the other hand, then the program flow goes to step S11 at which a decision is further made to determine if there is a lane-separating center zone on the right side of the lane 24a. When it is decided at step S11 that the center zone exists, then the set value $T_{1R}$ is set at step S12 to $T_{1R}=T_{14}$, followed by proceeding to step S15. On the other hand, when the decision at step S11 gives the negative result, then the program flow goes to step S13 at which it is further decided to determine if there is a car running in the opposite direction on the lane adjacent to and opposite to the lane 24a through the center line 21a as shown in FIG. 4. When the decision at step S13 gives the affirmative result, then the set value $T_{1R}$ is set to $T_{1R}=T_{13}$, followed by proceeding to step S15. On the other hand, if it is decided at step S13 that no car is running in the opposite direction on the adjacent lane 24, then the program flow goes to step S15.

At step S15 as shown in FIG. 6, a decision is made to determine if the set value i is set to i=0 or i=2, that is, if the road has only one lane on which the vehicle 1 is running in one direction or if the vehicle 1 is running on the left side end lane 24c, for example, as shown in FIG. 4. If the decision at step S15 gives the negative result, on the one hand, then the program flow goes directly to step S22. On the other hand, if the decision at step S15 gives the affirmative result, then the program flow goes to step S16 at which it is decided to determine if there is a guard rail at the left side of the lane 24c. When there is no guard rail at the left side of the lane 24c, then the program flow goes to step S18. If it is decided at step S16 that there is a guard rail on the left side of the lane 24c, then the set value $T_{1L}$ is set at step S17 to $T_{1L}=T_{16}$, followed to proceeding to step S18.

Then, at step S18, a decision is further made to determine if there is a pedestrian walkway abutting with the left side of the left side end lane 24c. When it is decided that there is the pedestrian walkway on the left side of the lane 24c, then the set value $T_{1L}$ is set at step S19 to $T_{1L}=T_{16}$, followed by proceeding to step S20. On the other hand, when the result of the decision at step S18 is in the negative, then the program flow goes to step S20.

At step S20, it is further decided to determine if there is a crossing near the vehicle 1 having a branch lane curving to the left, followed by proceeding to step S22 when the decision at step S20 gives the negative result and by proceeding to step S22 through step S21 at which the set value $T_{1L}$ is set to $T_{1L}=T_{17}$ when the decision at step S20 gives the affirmative result.

Then, at step S22, a decision is made to determine if the set value $T_{1R}$ is set to $T_{1R}=T_{12}$. If the decision at step S22 gives the negative result, on the one hand, then the program flow goes to step S25. If the result of the decision at step S22 is in the affirmative, on the other hand, it is determined that the vehicle 1 is running on the middle lane 24b. Then, the program flow goes to step S23 at which it is decided to determine if there is a car running behind on the lane 24a on the right side lane 24a, followed by proceeding to step S25 when it is decided that there is no car running behind on the adjacent right side lane 24a, on the one hand, and by proceeding to step S25 through step S24 at which the set value $T_{1R}$ is set to $T_{1R}=T_{18}$, when it is decided that there is the car running behind on the adjacent right side lane 24a, on the other hand.

Figure 7:
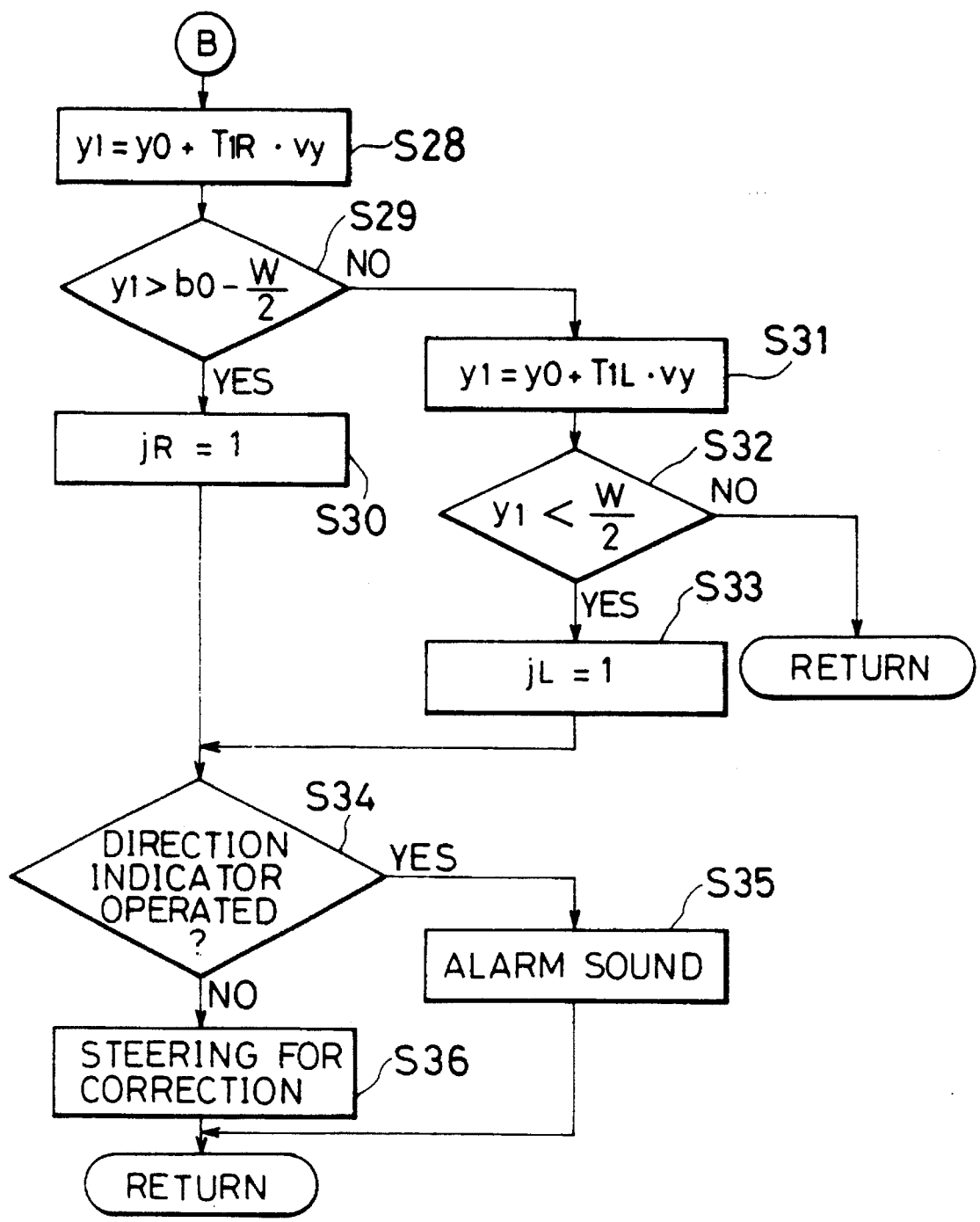

At step S25, it is decided to determine if the set value $T_{1L}$ is set to $T_{1L}=T_{12}$. If the decision at step S25 gives the negative result, on the one hand, then the program flow goes to step S28 as shown in FIG. 7. If the result of the decision at step S25 is in the affirmative, on the other hand, it is determined that the vehicle 1 is running on the middle lane 24b. Then, the program flow goes to step S26 at which it is decided to determine if there is a car running behind on the left side lane 24c, followed by proceeding to step S28 when it is decided that there is no car running behind on the adjacent left side lane 24c, on the one hand, and by proceeding to step S28 through step S27 at which the set value $T_{1L}$ is set to $T_{1L}=T_{18}$, when it is decided that there is the car running behind on the adjacent left side lane 24c, on the other hand.

Then, at step S28, the estimated position $y_1$ of the vehicle 1 is computed from the following formula: $y_1=y_0+T_{1R}\times v_y$, wherein the estimated position $y_1$ of the vehicle 1 is the position where the vehicle 1 will be located after having deviated to the right in a predetermined time, the reference symbol $y_0$ is the current position of the vehicle 1, the set value $T_{1R}$ is indicative of an extent of deviation towards the right from the lane 24 on which the vehicle 1 is running, and the reference symbol $v_y$ is the transversely moving velocity at which the vehicle 1 is moving in the transverse direction of the lane 24. Following step S28, it is decided at step S29 to determine if $y_1>(b_0-W/2)$, wherein $b_0$ is the lane width of the lane on which the vehicle 1 is running and W is a width of the vehicle 1. The decision at step S29 is so adapted as to determine if the vehicle 1 is running on the lane 24 while deviating in the right direction. When the decision at step S29 gives the affirmative result, it is determined that the vehicle 1 is deviating in the right direction so that the program flow goes to step S30 at which a flag $j_R$, indicative of the deviation towards the right of the lane 24 on which the vehicle 1 is running, is set to $j_R$, then proceeding to step S34.

On the other hand, when the decision at step S29 gives the negative result, then the program flow goes to step S31 at which the estimated position $y_1$ of the vehicle 1 is computed by the following formula: $y_1=y_0+T_{1L}\times v_y$, wherein the estimated position $y_1$ of the vehicle 1 is the position where the vehicle 1 will be located after having deviated to the left in a predetermined time, the current position $y_0$ of the vehicle 1, the set value $T_{1L}$ is indicative of a deviation towards the left from the lane 24 on which the vehicle 1 is running, and the reference symbol $v_y$ is the transversely moving velocity thereof. After step S31, it is then decided at step S32 to determine if $y_1<W/2$, that is, if the vehicle 1 is deviating to the left on the lane 24. If the decision at step S32 gives the affirmative result, then the program flow goes to step S33 at which a flag $j_L$, indicative of the deviation of the vehicle 1 to the left on the lane 24 on which the vehicle 1 is running, is set to $j_L=1$, followed by proceeding to step S34. On the other hand, if the decision at step S32 gives the negative result, then the program flow is returned to step S1. It can be noted herein that the procedures from steps S28 through S33 function in the operation unit 4 as the means for detecting the direction of deviation of the vehicle 1.

Then, at step S34, it is decided to determine if the direction indicator 7 has already been operated when it has been decided at step S30 or S33 that the vehicle 1 is deviating to the right or to the left, respectively. When it is decided at step S34 that the direction indicator 7 has already been operated, it can be determined that the vehicle 1 is being deviated on the basis of the operator's conscious steering so that an alarm sound is issued from the alarm 8 at step S35, followed by the return to step S1. On the other hand, when it is decided at step S34 that no direction indicator 7 has been operated, it can be determined that the action of the vehicle 1 to deviate from the lane is based on conscious or careless steering operations by the operator, so that the steering of the vehicle 1 is corrected at step S36.

Figure 8:
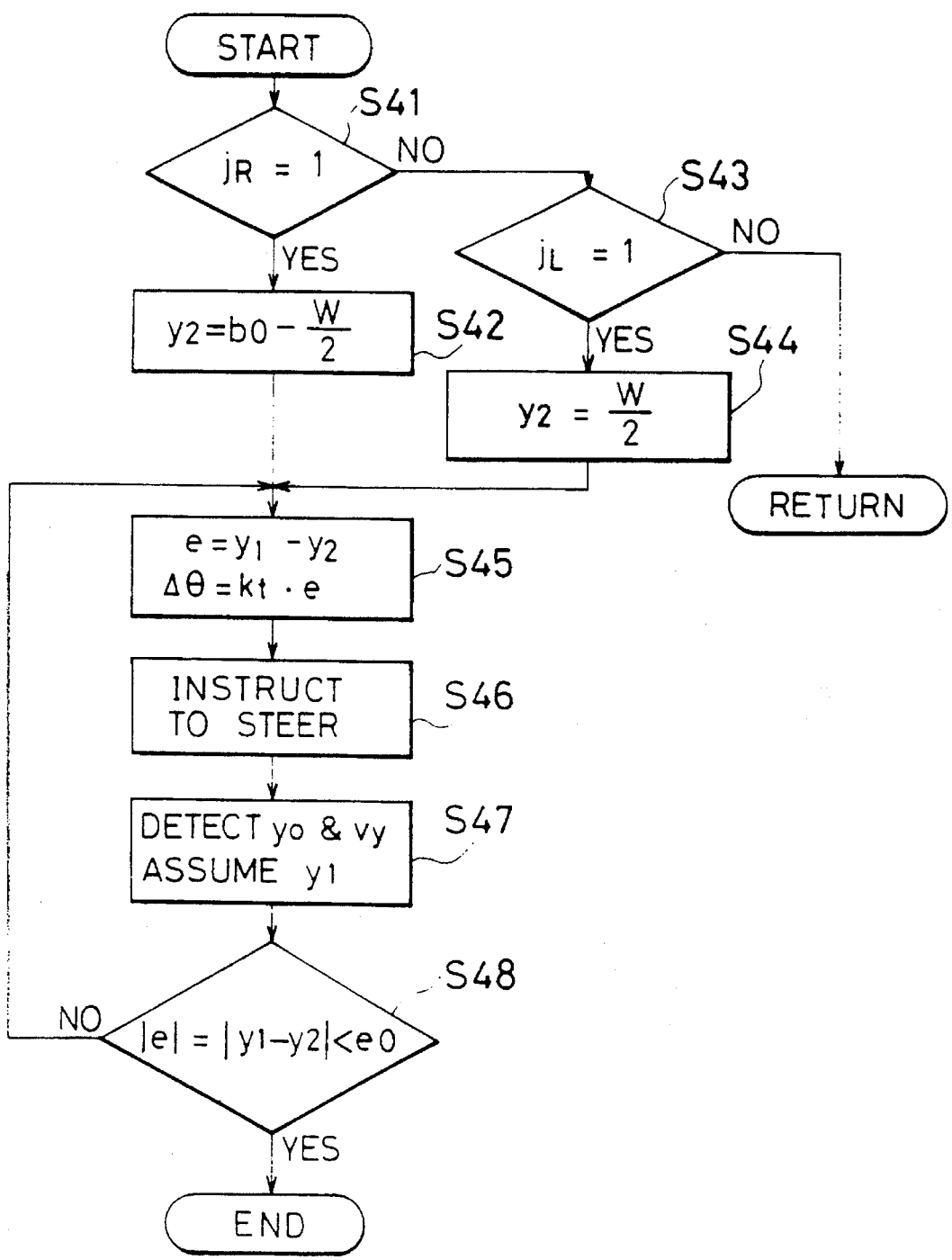

The correction of the steering of the vehicle can be made on the basis of the flowchart as shown in FIG. 8. At step S41, it is first decided to determine if the flag $j_R$ indicative of the deviation of the vehicle 1 towards the right is set to $j_R=1$. When the result of decision at step S41 indicates that the flag $j_R$ is set to $j_R=1$, then the program flow goes to step S42 at which the target position $y_2$ of the vehicle 1 is set to $y_2=b_0-W/2$, wherein the target position $y_2$ is the position where the vehicle 1 will be located when it would run in the predetermined time in such a state that the vehicle 1 is running with the right side of the vehicle 1 parallel to or coinciding with the right guide line 21. On the other hand, when it is decided at step S41 that the flag $j_R$ is not set to 1, then the program flow goes to step S43 at which a decision is further made to determine if the flag $j_L$ indicative of the deviation of the vehicle 1 towards the left on the lane 24 on which the vehicle 1 is running, followed by proceeding to step S45. When it is decided at step S43 that the flag $j_L$ is set to $j_L=1$, then the program flow goes to step S44 at which the target position $y_2$ of the vehicle 1 is set to $y_2=2/W$, wherein the target position $y_2$ is the position where the vehicle 1 will be located when it would run in the predetermined time in such a state that the vehicle 1 is running with the left side of the vehicle 1 parallel to or coinciding with the left guide line 21, followed by proceeding to step S45.

Then, at step S45, a deviation e can be computed by the following formula: $e=y_1-y_2$, and a steering angle $\Delta\theta$ to be corrected can be computed by the following formula: $\Delta\theta=k_f \times e$, wherein $k_f$ is a coefficient suitable for determining the steering angle from the deviation e. Then, at step S46, an instruction is given to the steering actuator unit 6 so as to correct the steering angle on the basis of the corrected steering angle $\Delta\theta$.

Thereafter, at step S47, the estimated position $y_1$ of the vehicle 1 is computed again from the current position $y_0$ of the vehicle 1 and the transversely moving velocity $v_y$, followed by proceeding to step S48 at which it is decided to determine if the absolute value of the deviation e, that is, the absolute value of $(y_i-y_2)$, is smaller than a threshold value $e_0$, that is, if the absolute value of the deviation e exists within an acceptable scope. When the decision at step S48 gives the negative result, then the program flow is returned to step S45. On the other hand, when it is decided at step S48 that the absolute value of the deviation e exists within the accepted scope, the steering angle is corrected, followed by the return to step S1.

The navigation control system according to the present invention can control the vehicle 1 even if the vehicle 1 is caused to be deviated from its original running lane, for example, due to the operator's careless steering operations. As shown in FIG. 1(a), for example, in the event where the vehicle 1 running in the middle position of the right side end lane 24a is about to deviate towards the right from the center line 21a, for example, due to the careless steering operations by the operator, the navigation control system according to the present invention can correct the steering of the vehicle 1 so as to allow the vehicle 1 to run along the guide line, that is, the center line 21a. The timing at which the steering of the vehicle 1 is to be corrected can be set in accordance with the urgency ratings required for the correction of the steering of the vehicle 1, which can be determined on the basis of the lane 24 on which the vehicle 1 is running and the direction in which the vehicle 1 is deviating from the lane 24 on which the vehicle 1 is running. The operations for correcting the steering of the vehicle 1 can be performed on the basis of priority of the urgency ratings. As shown in FIG. 1(a), for example, in the event where the vehicle 1 is deviating from the right side end lane 24a so as to go beyond the center line 21a, there is the risk that the vehicle 1 might be crashed upon the car running in the opposite direction on the lane adjacent to the lane 24a from which the vehicle 1 is deviating through the center line 21a. Hence, in this case, the urgency rating for correction of the steering is set to a very high level so that the steering is to be corrected at an earlier timing. On the other hand, as shown in FIG. 1(b), for example, the vehicle 1 is shown to be deviating from the left side lane 24c so as to go beyond the guide line 21e; however, in this case, the urgency rating can be said to be lower than the urgency rating as shown in FIG. 1(a) when no car is running behind on the lane 24a adjacent to the lane 24c from which the vehicle 1 is deviating, so that the steering can be corrected at a timing later than the timing to be corrected in the case as shown in FIG. 1(a).

After the steering of the vehicle 1 has been corrected and the vehicle 1 has been allowed to run along the guide line 21 while the side of the vehicle 1 coincides with the guide line 21, the vehicle 1 can be returned to the middle position of the lane by manual steering by the operator.

In the embodiment of the present invention as described hereinabove, it can be noted that the operative timing for correcting the steering of the vehicle 1 is set in accordance with the urgency ratings which are to be determined on the basis of the relationship of the lane 24 on which the vehicle 1 is running with the lanes other than the lane 24 and the direction in which the vehicle is deviating from the lane 24. It can be noted herein, however, that safety can be ensured and a frequency of operations of correcting the steering of the vehicle can be reduced even if the urgency ratings would be set uniformly on the basis of the lane 24 on which the vehicle 1 is running and the adjacent lanes, without taking the direction of deviation into account.

Further, it can be noted herein that, although the embodiment of the present invention as described hereinabove is directed to the case where the steering actuator unit 6 is so arranged as to function as the means for suppressing the deviation of the vehicle 1, the such means is not restricted to the steering actuator unit 6, however, and it may be arranged in such a manner that an alarm sound is produced from an alarm as the vehicle is deviating from the lane, thereby allowing the operator to perform the operations for steering the vehicle so as to avoid the deviation to go beyond the lane on which the vehicle is running. In this case, when the alarm 8 is set as the means for suppressing the deviation of the vehicle, the alarm 8 is so arranged as to be operated at step S36 as shown in FIG. 7.

In addition, the embodiment of the present invention is configured in such a manner that the position of the vehicle 1 running on the lane is detected by a combination of the camera 2, the signal processing unit 3, and the operation unit 4; however, other conventional techniques can be utilized, which may include, for example, technique of communication between the road and the vehicle by means of beacons or technique of recognizing the position of the lane by reading bar codes formed on the road surface while the vehicle 1 is running.

The following is a description of other embodiments of the navigation control system for the automotive vehicle according to the present invention with reference to FIGS. 9 to 14. For brevity of explanation, the same elements are provided with the same reference numerals and symbols as in the first embodiment of the present invention as described hereinabove, and a duplicate explanation will be omitted from the description that follows.

Figure 9:
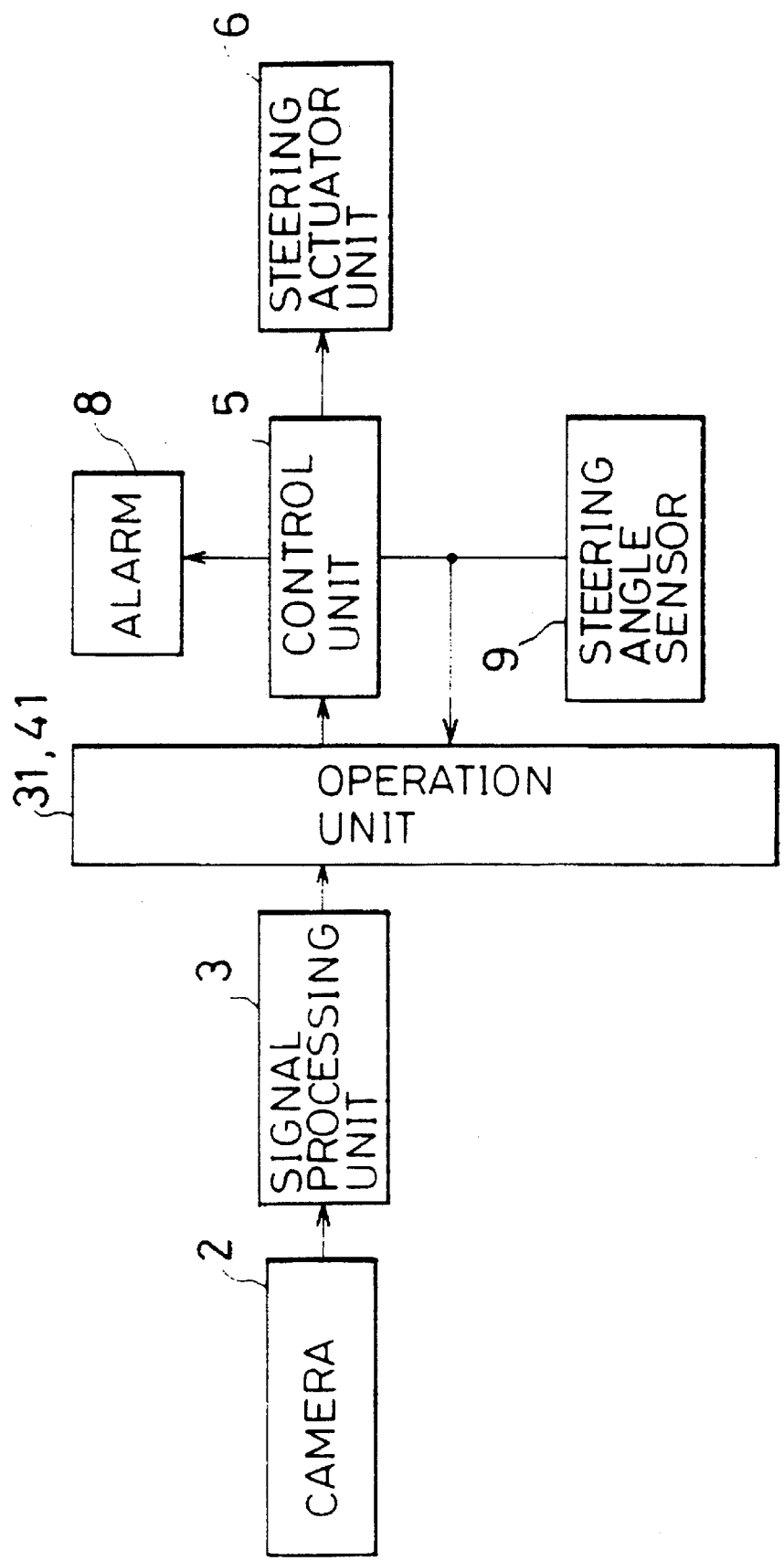
FIG. 9 is a block diagram showing a navigation control system according to a second embodiment of the present invention.

FIG. 9 shows the configuration of the navigation control system according to a second embodiment of the present invention, in which the navigation control system comprises the camera 2, the signal processing unit 3, an operation unit 31, the control unit 5, the steering actuator unit 6, the alarm 8, and the steering angle sensor 9.

The operation unit 31 is so arranged as to compute the current position $y_0$ of the vehicle 1 running on the lane 24, the estimated position $y_1$ of the vehicle 1 that will be located after a predetermined period of time, the transversely moving velocity $v_y$, the lane width $b_0$ of the lane 24, a distance $d_L$ ranging from the left side of the vehicle 1 at the estimated position $y_1$ to the guide line 21 at the left side of the lane 24, and a distance $d_R$ ranging from the right side of the vehicle 1 at the estimated position $y_1$ to the guide line 21 at the right side of the lane 24 as well as to detect the direction in which the vehicle 1 is deviating from the lane 24 on which the vehicle 1 is running, on the basis of the input signals from the signal processing unit 3 that can convert the image signals entered from the camera 2 into the signals processible by the operation unit 4. Further, the operation unit 31 is so arranged as to detect a shape of a road as being extending straight forward or curved on the basis of the input signals from the signal processing unit 3 as well as to compute a threshold value Ds for the straight road and a threshold value Dc for the curved road. Hence, the camera 2, the signal processing unit 3, and the operation unit 4 constitute means for detecting the direction of deviation of the vehicle, means for detecting the shape of the road, means for detecting the curved road, and means for detecting a lane width of the lane.

Figure 11:
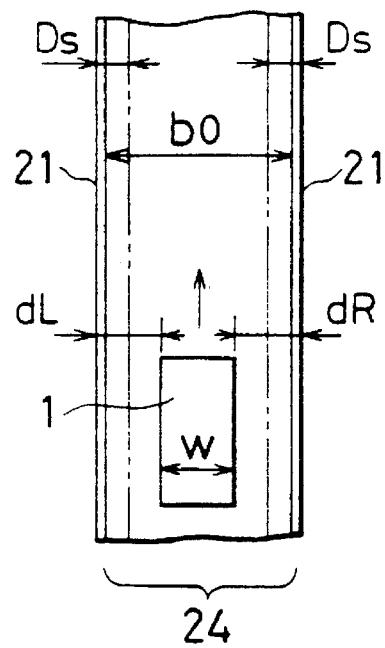
FIG. 11 is a schematic representation showing the instance in which the vehicle is running on a straight lane.

As shown in FIG. 11, the threshold value Ds is so set as to indicate the distance virtually set in the transverse direction of the straight lane 24 in a predetermined distance from the left side guide line 21 or from the right side guide line 21. On the other hand, like the threshold value Ds, the threshold value Dc is so set as to indicate the distance virtually set in the transverse direction of the curved lane 24 in a predetermined distance from the left side guide line 21 or from the right side guide line 21.

The operation unit 31 can compute the estimated position $y_1$ of the vehicle 1 to be located in the predetermined period of time by the formula: $y_1 = y_0 + v_y \times T_1$, on the basis of the current position $y_0$ of the vehicle 1 and the transversely moving velocity $v_y$ thereof, in the same manner as described hereinabove. Further, the operation unit 31 can determine if the vehicle 1 is deviating towards the guide line 21 while crossing the threshold value Ds or Dc at the estimated position $y_1$. When the operation unit 31 has determined that the vehicle 1 is crossing the threshold value Ds or Dc and it is about to deviate to thereby go beyond the guide line 21, the control unit 5 is controlled to operate the steering actuator unit 6 so as to correct the steering of the vehicle to thereby avoid the deviation going beyond the guide line 21 and to thereby produce an alarm sound as well.

A description will now be made of the operations of the navigation control system according to this embodiment of the present invention with reference to the flowcharts as shown in FIGS. 10 through 15.

Figure 10:
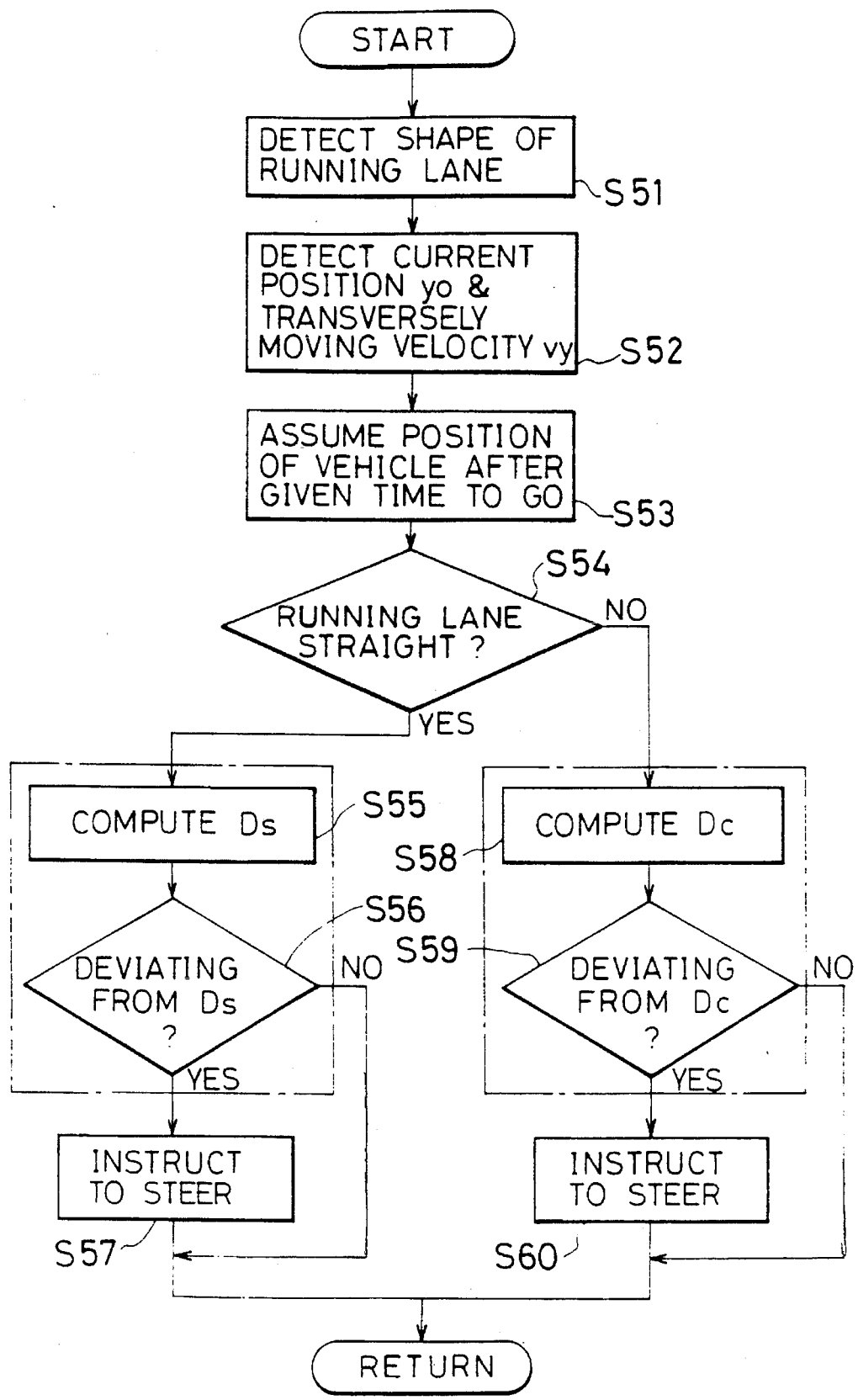
FIG. 10 is a flow chart showing the action of the navigation control system according to the second embodiment of the present invention in accordance with the state of the road.

As shown in FIG. 10, first at step S51, the shape of the road on which the vehicle 1 is running is detected on the basis of the output from the camera 2 through the signal processing unit 3. Then, at step S52, the current transverse position $y_0$ of the vehicle 1 running on the lane 24 and the transversely moving velocity $v_y$ thereof are detected, followed by proceeding to step S53 at which the estimated position $y_1$ of the vehicle 1 is estimated after a predetermined period of time.

Then, a decision is made at step S54 on the basis of the result of the detection at step S51 to determine if the lane is straight, followed by proceeding to step S55 at which the threshold value Ds is computed when it is decided that the lane is straight. Following step S55, it is then decided at step S56 to determine if the vehicle 1 is crossing the threshold value Ds on the basis of the threshold value Ds and the estimated position $y_1$ of the vehicle 1 computed at step S53. If the result of decision at step S56 indicates that the vehicle 1 is crossing the threshold value Ds, then the program flow goes to step S57 at which an instruction is issues to correct the steering of the vehicle 1, thereby avoiding the deviation of the vehicle 1 from the lane 24.

Figure 12:
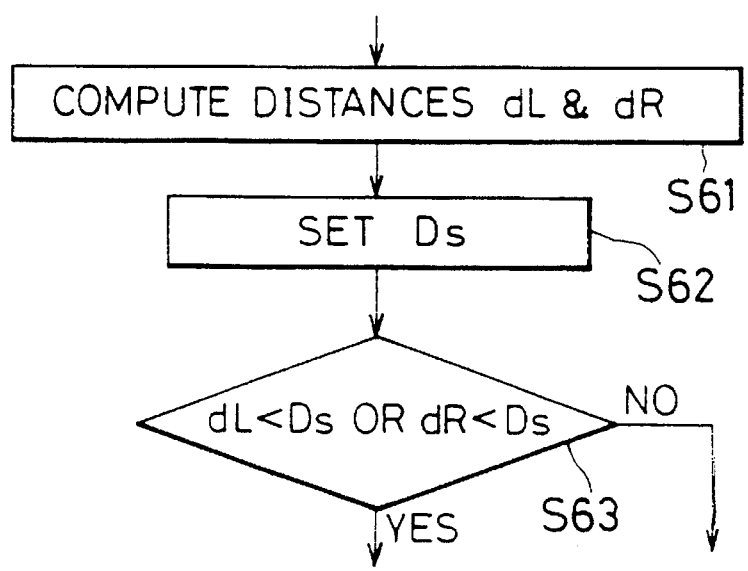
FIGS. 12 and 13 are a flow chart showing the action of the navigation control system according to the present invention when the vehicle is running on the straight lane.

A detailed description will now be made of the operations at steps S55 and S56. As shown in FIGS. 11 and 12, the distances $d_L$ and $d_R$ ranging from the left side and the right side of the vehicle 1 at the estimated position $y_1$ of the vehicle 1 to the guide lines 21 and 21, respectively, are computed at step S61, and the threshold value Ds is computed at step S62. Then, the program flow goes to step S63 at which a decision is made to determine if the distance $d_L$ is smaller than the threshold value Ds or if the distance d is smaller than the threshold value R Ds. When the decision at step S63 gives the affirmative result, then the program flow goes to step S57 at which the instruction is issued to correct the steering of the vehicle 1. On the other hand, when the decision at step S63 gives the negative result, then the program flow returns to step S51.

On the other hand, it is decided at step S54 that the lane is not straight and the lane is curved, then the program flow goes to step S58 at which the threshold value Dc is computed. Then, at step S59, it is decided to determine if the vehicle 1 is crossing the threshold value Dc on the basis of the threshold value Dc and the estimated position $y_1$ of the vehicle 1 computed at step S53, followed by proceeding to step S60 at which the instruction is produced to correct the steering of the vehicle to thereby avoid the deviation of the vehicle 1 going beyond the lane 24, on the one hand, when the decision at step S59 gives the affirmative result and followed by the return to step S51, on the other hand, when the decision at step S59 gives the negative result.

Figure 13:
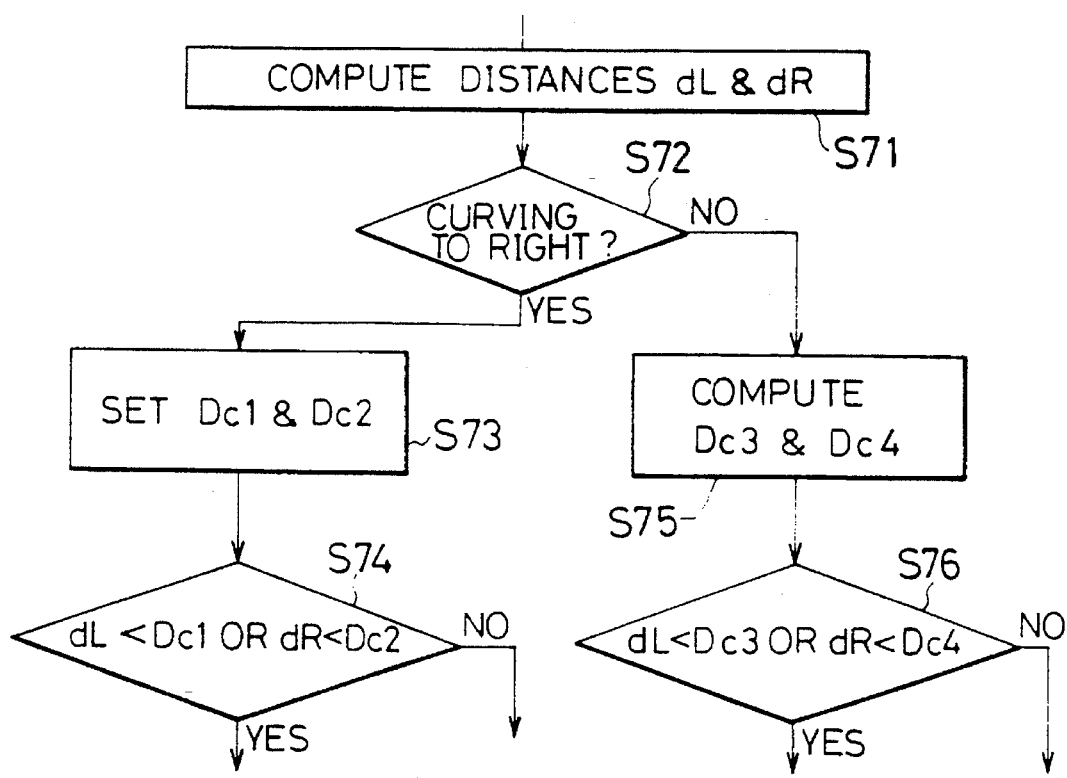
Figure 14:
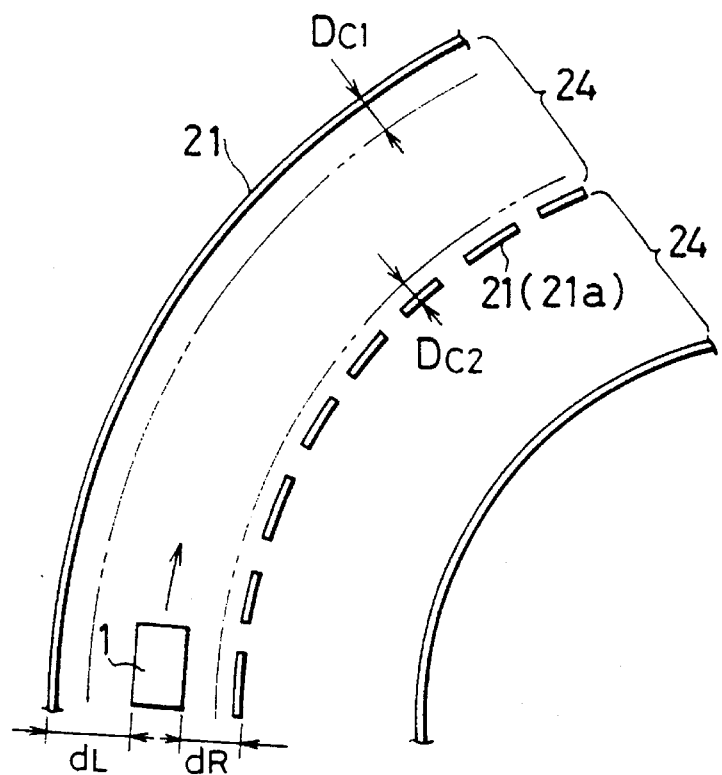
FIGS. 14 and 15 are each a schematic representation showing the instance in which the vehicle is running on a curved lane.

A detailed description will now be made of the operations at step S58 and at step S59 with reference to FIG. 13. First, at step S71, the distance $d_L$ between the left side of the vehicle and the guide line 21 at the corresponding side of the lane on which the vehicle is running is computed at the estimated position $y_1$ of the vehicle and, likewise, the distance $d_R$ between the right side of the vehicle and the guide line 21 at the corresponding side of the lane is computed at the estimated position $y_1$ of the vehicle. Then, at step S72, it is decided to determine if the road has only one lane extending in one direction and curved to the right as shown in FIG. 14. If the result of decision at step S72 indicates that the lane is curved to the right, then the program flow goes to step S73 at which a left-side threshold value $D_{c1}$ and a right-side threshold value $D_{c2}$ are set. In this case, the left-side threshold value $D_{c1}$ is set larger than the right-side threshold value $D_{c2}$ with the transverse acceleration (transverse G) taken into account. Thereafter, the program flow goes to step S74 at which it is decided to determine if the distance $d_L$ is smaller than the left-side threshold value $D_{c1}$ or if the distance $d_R$ is smaller than the right-side threshold value $D_{c2}$. When the decision at step S74 gives the affirmative result, on the one hand, then the program flow goes to step S60 at which an instruction is issued in order to steer the vehicle. When the decision at step S74 gives the negative result, on the other hand, then the program flow returns to step S51.

Figure 15:
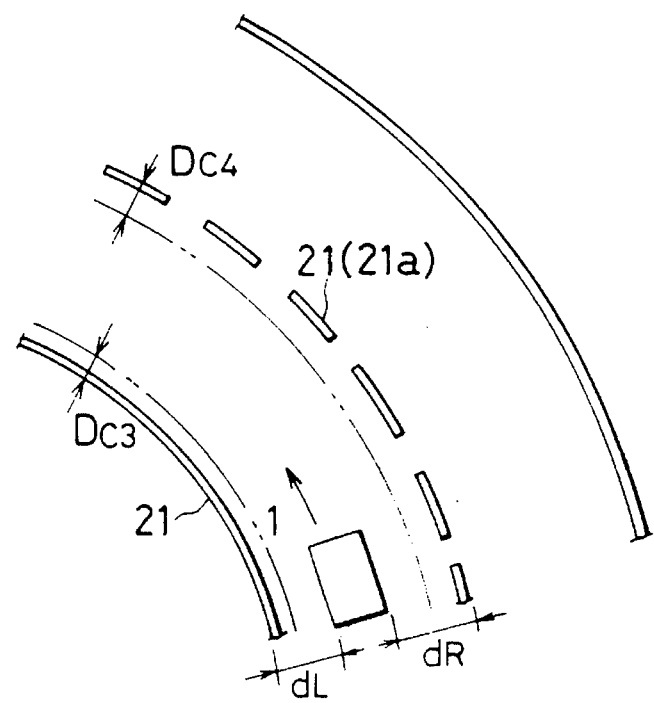

When the decision at step S72 gives the negative result, that is, when it is determined that the lane is curved to the left as shown in FIG. 15, a left-side threshold value $D_{c3}$ and a right-side threshold value $D_{c4}$ are set at step S75. In this case, the right-side threshold value $D_{c4}$ is likewise set larger than the left-side threshold value $D_{c3}$. Then, the program flow goes to step S76 and it is decided to determine if the distance $d_L$ is smaller than the left-side threshold value $D_{c3}$ or the distance $d_R$ is smaller than the right-side threshold value $D_{c4}$. When the decision at step S76 gives the affirmative result, then the program flow goes to step S60 at which an instruction is issued in order to steer the vehicle. On the other hand, when the decision at step S76 gives the negative result, then the program flow returns to step S51.

Further, the threshold value Dc is set larger than the threshold value Ds because the curved lane is more disadvantageous than the straight lane in terms of vision and stability in navigation. This allows the different timing of correcting the steering of the vehicle to be set in order to comply with both of the curved lane and the straight lane and it enables the correction of the steering of the vehicle to be made at an earlier timing when the vehicle is running on the curved lane than when it is running on the straight lane.

In this embodiment, the camera 2 and the signal processing unit 3 are conveniently combined with the operation unit 4 in order to detect the shape of the lane 24 on which the vehicle is running. It can be noted, however, that the shape of the lane 24 can be detected by conventional techniques as described hereinabove, such as the technique of communication between the road and the vehicle by means of beacons or the technique of recognizing the position of the lane by reading bar codes formed on the road surface while the vehicle 1 is running. Further, the threshold values Ds and Dc can be inputted directly from the side of the lane 24 by means of the techniques as described hereinabove. In addition, the alarm 8, for example, may be employed as the means for suppressing the deviation of the vehicle in place of the steering actuator unit 6 as in the previous embodiment as described hereinabove.

A description will be made of the further embodiments of the navigation control systems according to the present invention with reference to FIG. 9 and FIGS. 16 to 18. For brevity of explanation, the same elements and means are provided with the same reference numerals and symbols as in the previous embodiments of the present invention as described hereinabove, and a duplicate explanation will be omitted from the description that follows.

The navigation control system according to the embodiments of the present invention has the configuration as shown in FIG. 9, in which an operation unit 41 is provided in place of the operation unit 31 and the other elements are configured in substantially the same manner as in the second embodiment as described hereinabove.

Figure 18:
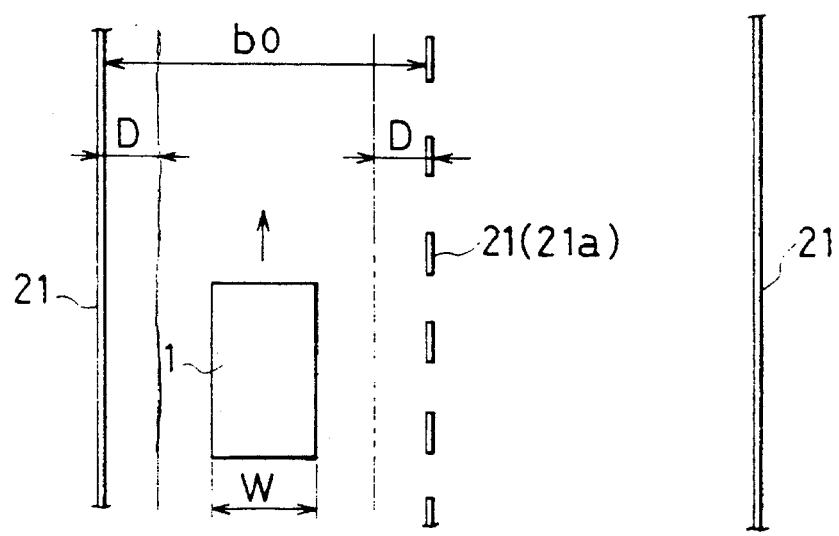
FIG. 18 is a schematic representation showing a lane illustrated for a description of the operations of the navigation control system as shown in FIG. 16.

The operation unit 41 is configured in such a manner that there are determined the current position $y_0$ of the vehicle 1 running on the lane 24, the estimated position $y_1$ of the vehicle 1 in the predetermined time, the transversely moving velocity $v_y$, the lane width $b_0$ of the lane on which the vehicle 1 is running, the distance $d_L$ between the left side of the vehicle 1 and the corresponding guide line 21 at the estimated position $y_1$, the distance $d_R$ between the right side of the vehicle 1 and the corresponding guide line 21 at the estimated position $y_1$, and so on are determined on the basis of the input signals from the signal processing unit 3 and that the threshold value D as indicated in FIG. 18 is computed on the basis of the lane width $b_0$. Hence, the camera 2, the signal processing unit 3 and the operation unit 41 constitute the means for detecting the lane width of the lane on which the vehicle is running.

The threshold value D is set in accordance with the lane width $b_0$ of the lane on which the vehicle is running so that it varies with the lane width $b_0$ of the lane. It can be noted herein that the threshold value D indicates the distance that is virtually set in a predetermined distance in a middle direction of the lane 24 on the basis of the left and right guide lines 21 and 21 on the lane 24, like the threshold values Ds and Dc.

Figure 16:
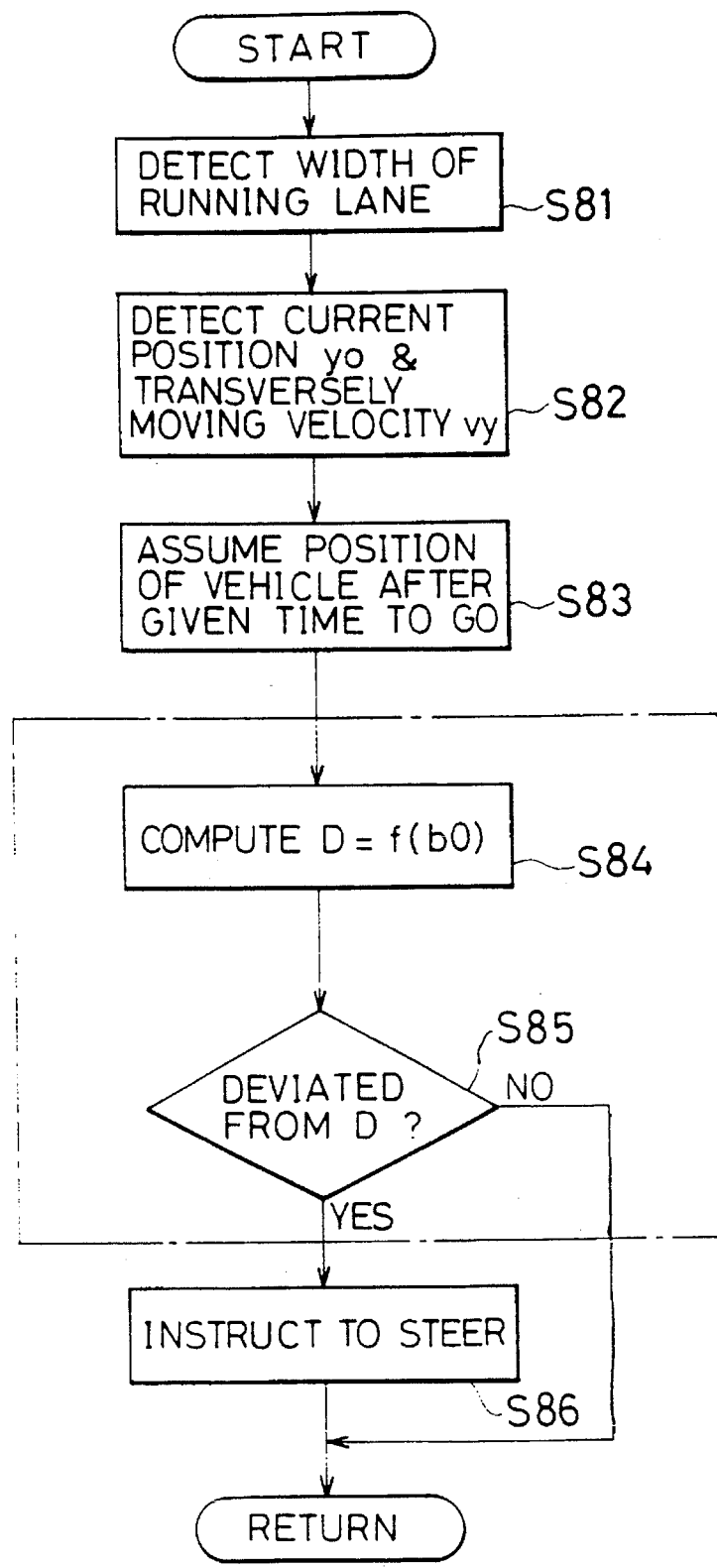
FIGS. 16 and 17 are a flow chart showing the action of the navigation control system according to the present invention when the vehicle is running on the curved lane.

The operations of the navigation control system according to the embodiment of the present invention can be described with reference to FIGS. 16 and 18.

First, at step S81, the lane width $b_0$ of the lane 24 on which the vehicle 1 is running is detected through the signal processing unit 3 on the basis of the output of the camera 2, followed by proceeding to step S82 at which the transverse position yo of the vehicle 1 on the lane 24 and the transversely moving velocity $v_y$ of the vehicle 1 are detected and then to step S83 at which the estimated position $y_1$ of the vehicle 1 after elapse of the predetermined time.

Then, at step S84, the threshold value D is computed on the basis of the lane width $b_0$ determined at step S81, followed by proceeding to step S85 at which it is decided to determine on the basis of the threshold value D and the estimated position $y_1$ of the vehicle 1 determined at step S83 if the vehicle 1 is going beyond the threshold value D. When the decision at step S85 gives the affirmative result, an instruction for correcting the steering of the vehicle 1 is issued at step S86 and the steering is corrected in order to avoid the deviation of the vehicle 1 running on the lane 24.

Figure 17:
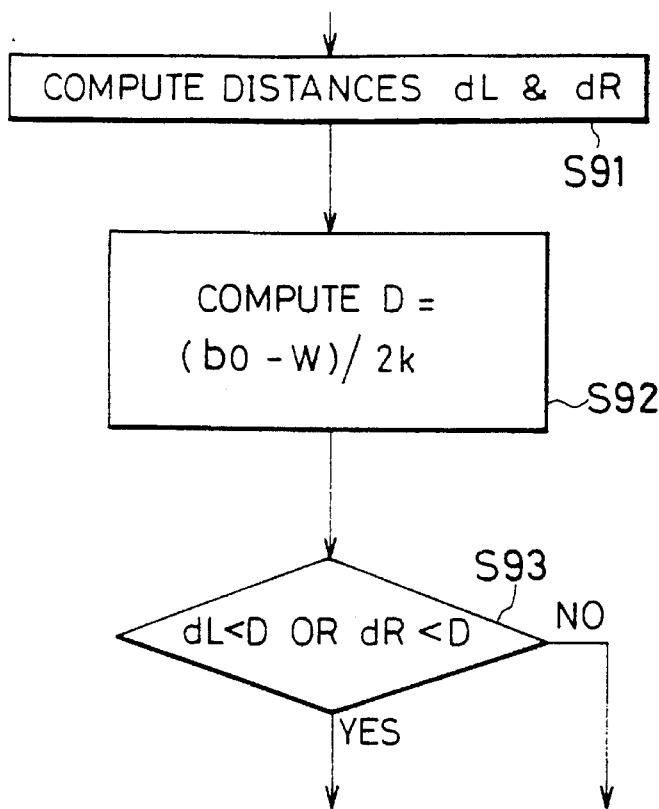

A further description will be made of the operations at steps S84 and S85. As shown in FIG. 17, the distances $d_L$ and $d_R$ between the left side and the right side of the vehicle 1 and the corresponding guide lines 21 and 21 at the estimated position $y_1$ of the vehicle are computed at step S91. Further, the threshold value D is computed at step S92 from the formula:

$$D = (b_0 - W)/2k$$

(where W is the width of the vehicle 1; and k is a coefficient).

Then, at step S93, a decision is made to determine if the distance $d_L$ is smaller than the threshold value D or if the distance $d_R$ is smaller than the threshold value D. When the decision at step S93 gives the affirmative result, an instruction to steer the vehicle is issued at step S86. On the other hand, when the decision at step S93 gives the negative result, the program flow is returned to step S81.

As is apparent from the formula as described hereinabove, the threshold value D is set to be larger when the lane width $b_0$ of the lane 24 is wider than a given value and the threshold value D is set to be smaller than the lane width $b_0$ of the lane 24 is narrower than a given value. This makes it likely to correct the steering of the vehicle in order to improve safety when the lane width $b_0$ is wide. On the other hand, if the threshold value D is set in the same manner when the lane width $b_0$ is narrower as when the lane width $b_0$ is wider, the steering of the vehicle 1 is corrected very frequently, providing the passengers with a feeling of unpleasantness; hence, this setting can prevent the steering of the vehicle from being corrected frequently, thereby offering a feeling of pleasantness to the passengers.

In this embodiment, the camera 2 and the signal processing unit 3 are conveniently combined with the operation unit 4 in order to recognize the lane width $b_0$ of the lane 24 on which the vehicle is running. It can be noted, however, that the lane width $b_0$ of the lane 24 can be detected by conventional techniques as described hereinabove, such as the technique of communication between the road and the vehicle by means of beacons or the technique of recognizing the position of the lane by reading bar codes formed on the road surface while the vehicle 1 is running. Further, the threshold values Ds and Dc can be inputted directly from the side of the lane 24 by means of the techniques as described hereinabove. In addition, the alarm 8, for example, may be employed as the means for suppressing the deviation of the vehicle in place of the steering actuator unit 6 as in the previous embodiments as described hereinabove.

A description will be made of still further embodiments of the navigation control systems for the automotive vehicle according to the present invention with reference to FIGS. 10, 18 and 19. For brevity of explanation, the same elements are provided with the same reference numerals and symbols as in the previous embodiments of the present invention as described hereinabove, and a duplicate explanation will be omitted from the description that follows.

The conditions for altering the timing for operating the steering actuator unit 6 or the alarm 8 as the means for suppressing the deviation of the vehicle from the lane may include, for example, the likelihood of the vehicle 1 to deviate from the lane 24 on which the vehicle 1 is running; the degree of a behavior of the vehicle 1, that is, stability in navigation of the vehicle 1; the degree of an approach to other vehicles, that is, the degree of a danger of an impact upon the other vehicle; and the vision, as will be described in the table below, in addition to those conditions as enumerated for the previous embodiments of the navigation control system according to the present invention. The configuration of the navigation control system capable of performing the operations in accordance with each of the above-mentioned conditions may be shown in FIG. 19.

The specific conditions that the vehicle 1 is likely to deviate from the lane 24 on which the vehicle 1 is running may include, for example, a vehicle velocity of the vehicle 1 and a steering angle with respect to the lane 24. When the vehicle 1 is running on the lane 24 at a high vehicle velocity, for example, the vehicle 1 can appropriately be suppressed from deviating from the lane 24 by making the threshold value D as shown in FIG. 18 larger, that is, by making the timing for operating the steering actuator unit 6, for example, relatively earlier. On the other hand, for example, when the vehicle 1 is running at a low vehicle velocity, a frequency of operating the steering actuator unit 6 can be reduced by making the threshold value D smaller, that is, by relatively delaying the timing for operating the steering actuator unit 6.

Figure 19:
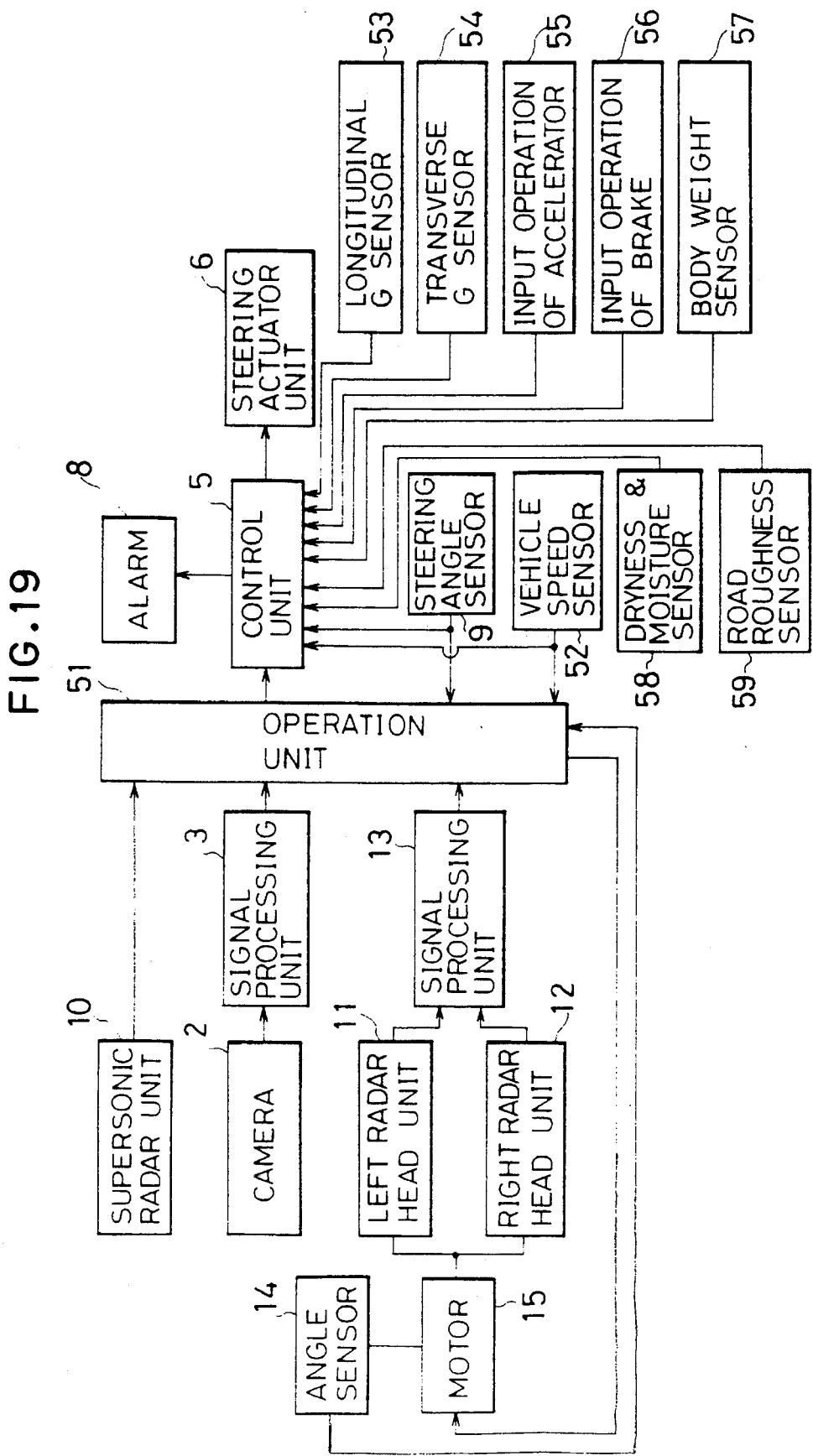
FIG. 19 is a block diagram showing the configuration of a further embodiment of the navigation control system according to the present invention.

The vehicle velocity can be detected by a vehicle velocity sensor 52 as the means for detecting the vehicle velocity as shown in FIG. 19, and the steering angle can be detected by a steering angle sensor 9.

Further, the specific conditions that affect the behavior of the vehicle 1, i.e. stability in navigation of the vehicle 1 may include, for example, longitudinal acceleration or deceleration of the vehicle, an action of operating an accelerator, an action of operating a brake, transverse acceleration, an angle at which the vehicle is slipping in a transverse direction on the lane, a yaw rate, a steering angle velocity, a body weight, a road surface friction coefficient (road surface μ), and a degree of roughness on the surface of the road.

The stability in navigation of the vehicle 1 can be prevented from worsening by rapid operations of steering a steering wheel in order to avoid the deviation of the vehicle 1 from the lane 24 by operating the steering actuator unit 6 at a relatively earlier timing on each of the specific conditions as described hereinabove as the stability in navigation becomes lower. On the other hand, a frequency of operating the means for suppressing the deviation of the vehicle 1 from the lane 24 can likewise be reduced by relatively delaying the timing for operating the steering actuator unit 6 as the stability in navigation of the vehicle 1 becomes higher.

The conditions affecting the degree of the behavior of the vehicle 1 can be detected by sensors or by other appropriate procedures. For example, the longitudinal acceleration or deceleration of the vehicle can be sensed by a longitudinal G sensor 53; the action of operating the accelerator can be detected by sensing the input 55 indicative of the operation of the accelerator; the action of operating the brake can be detected by sensing the input 56 indicative of the operation of the brake; the transverse acceleration can be sensed with a transverse G sensor 54; the angle at which the vehicle is slipping in the transverse direction on the lane can be detected by the steering angle sensor 9; the yaw rate can be sensed with the transverse G sensor; the steering angle velocity can be detected with the steering angle sensor 9; the body weight of the vehicle can be sensed with a body weight sensor 57; the road surface friction coefficient (road surface μ) can be detected with a dryness-moisture sensor 58; and the degree of roughness on the surface of the road can be sensed on the basis of the input from a road surface roughness sensor 59. Each of the sensors constitutes means of detecting the stability in navigation of the vehicle.

In addition, the specific conditions for the approach to the other vehicle may include, for example, a distance between the vehicle 1 and the other vehicle running ahead and a crowd of traffic. The risky state in which the vehicle 1 approaches to the other vehicle running ahead to such an extent that the vehicle 1 bumps against the other vehicle can be prevented by operating the steering actuator unit 6 at a relatively earlier timing as the degree of the approach of the vehicle 1 to the other vehicle becomes higher due to the specific condition as described hereinabove. On the other hand, a frequency of operating the means of suppressing the deviation of the vehicle from the lane can likewise be reduced by relatively delaying the timing for operating the steering actuator unit 6 as the degree of the approach of the vehicle 1 to the other vehicle becomes lower.

It can be noted herein that the distance between the vehicle 1 and the vehicle running ahead can be detected by the arrangement of the forward-detection supersonic radar unit 10 as the means for detecting the approach to the other vehicle, the left radar head unit 11, the right radar head unit 12, and the signal processing unit 3 or an arrangement of the camera 2, the signal processing unit 3, and the operation unit 4. Further, they may be detected, for example, by communication between the road and the vehicle.

Furthermore, the specific conditions that affect the vision may include, for example, a day time or a night time or the presence or the absence of fog. The action of the vehicle 1 to deviate from the current lane towards the adjacent lane on which an obstacle might exist ahead can be suppressed by operating the steering actuator unit 6 at a relatively earlier timing when the vision is poorer than when the vision is better, thereby preventing the vehicle 1 from causing an accident due to the delay in avoiding the obstacle on account of the poor vision. Further, a frequency of operating the means for deviating the vehicle from the current lane can likewise be reduced.

It can be noted herein that the day time, the night time or the presence or the absence of fog can be detected by the arrangement of the camera 2 as means for detecting the vision or by communication between the vehicle and the road on which the vehicle is running.

In addition, for example, when the vehicle speed is set as the condition for altering the timing of operating the steering actuator unit 6, the operations as shown in FIG. 10 may be arranged in such a manner that the vehicle speed is detected at step S51; it is then decided at step S54 to determine if the detected vehicle speed is smaller than a predetermined value; a threshold value D that is a small value in accordance with a lower vehicle speed is set at step S55, on the one hand, when the decision at step S54 gives the affirmative result; and a threshold value D that is a large value in accordance with a higher vehicle speed is set at step S58, on the other hand, when the decision at step S54 gives the negative result. The other conditions can be set in substantially the same manner as described immediately hereinabove.

The table below summarizes the relationship of the conditions for altering the timing of steering the vehicle in accordance with the threshold value D.

TABLE

| | CONDITIONS | | THRESHOLD VALUE D | |
|---|---|---|---|---|
| | | | LARGER | SMALLER |
| 1 | LIKELIHOOD TO DEVIATE FROM CURRENT LANE | | EASY | DIFFICULT |
| | SPECIFIC | VEHICLE SPEED | HIGHER | LOWER |
| | CONDITIONS | STEERING ANGLE TO LANE | LARGER | SMALLER |
| 2 | BEHAVIOR OF VEHICLE | | LARGER | SMALLER |
| | (STABILITY IN NAVIGATION OF VEHICLE) | | (UNSTABLE) | (STABLE) |
| | SPECIFIC | LONGITUDINAL ACCELERATION | LARGER | SMALLER |
| | CONDITIONS | OR DECELERATION | | |
| | | OPERATION OF ACCELERATOR | LARGER | SMALLER |
| | | OPERATION OF BRAKE | ON | OFF |
| | | ANGLE OF TRANSVERSE SLIP | LARGER | SMALLER |
| | | YAW RATE | LARGER | SMALLER |
| | | STEERING ANGULAR VELOCITY | LARGER | SMALLER |
| | | BODY WEIGHT | LARGER | SMALLER |
| | | ROAD SURFACE FRICTION COEFFICIENT | SMALLER | LARGER |
| | | ROUGHNESS ON ROAD SURFACE | LARGER | SMALLER |
| 3 | DEGREE OF APPROACH TO OTHER VEHICLE | | HIGHER | LOWER |
| | (DEGREE OF RISK) | | (RISKY) | (SAFE) |
| | SPECIFIC | DISTANCE BETWEEN VEHICLES | LARGER | SMALLER |
| | CONDITIONS | CROWD OF TRAFFIC | HIGHER | LOWER |
| 4 | | VISION | GOOD | BAD |
| | SPECIFIC | DAY TIME OR NIGHT TIME | NIGHT | DAY |
| | CONDITIONS | FOG | PRESENT | ABSENT |

What is claimed is:

1. A navigation control system for an automotive vehicle running on a road, comprising:

deviation detecting means for detecting that the vehicle has deviated or is going to deviate from a lane of the road;

deviation suppressing means for suppressing the vehicle from deviating from the lane;

detection means for detecting a predetermined condition affecting deviation of the vehicle from the lane; and control means for computing a control amount for suppressing the deviation of the vehicle based on a result of detection by said deviation detecting means, for determining a urgency rating for said deviation suppressing based on said detected predetermined condition and said control amount, and for controlling said deviation suppressing means on the basis of a result of the computing the control amount, said deviation suppressing means being controlled by altering a time for operating said deviation suppressing means in accordance with said urgency rating for said deviation suppressing.

2. A navigation control system for an automotive vehicle as claimed in claim 1, wherein said predetermined condition is set as a position of the vehicle on the lane on which the vehicle is currently running.

3. A navigation control system for an automotive vehicle as claimed in claim 2, wherein said predetermined condition is set as a position of the lane in a transverse direction of the road on which the vehicle is currently running.

4. A navigation control system for an automotive vehicle as claimed in claim 1, wherein:

said predetermined condition is set as to whether a road on which the vehicle is running has another lane on which another vehicle is running in the same direction as the vehicle, in addition to the lane on which the vehicle is currently running; and said control means is set to operate said deviation suppressing means at a timing earlier when the road has such another lane than when the road has no such another lane.

5. A navigation control system for an automotive vehicle as claimed in claim 1, wherein said predetermined condition is set as a transverse position of the vehicle on the lane and as a direction in which the vehicle is deviating from the lane; and said control means is set to alter the timing of operating said deviation suppressing means in accordance with the transverse position of the vehicle and the direction of deviation of the vehicle.

6. A navigation control system for an automotive vehicle as claimed in claim 1, wherein said predetermined condition is set as to whether an adjacent lane existing in the direction of deviation of the vehicle from the lane is a lane on which another vehicle is running in the same direction or in the opposite direction; and said control means is set to operate said deviation suppressing means at a timing earlier when the adjacent lane is for another vehicle running in the opposite direction than when the adjacent lane is for another vehicle running in the same direction.

7. A navigation control system for an automotive vehicle as claimed in claim 1, wherein said predetermined condition is set as to whether there is a road shoulder existing in the direction of deviation of the vehicle from the lane or there is a lane on which another vehicle is running in the same direction; and said control means is set to operate said deviation suppressing means at a timing earlier when there is such a road shoulder than when there is the adjacent lane for another vehicle running in the same direction.

8. A navigation control system for an automotive vehicle as claimed in claim 1, wherein said predetermined condition is set as to whether there is an obstacle in a direction in which the vehicle is deviating from the lane; and said control means is set to operate said deviation suppressing means at a timing earlier when there is such an obstacle than when there no such an obstacle.

9. A navigation control system for an automotive vehicle as claimed in claim 1, wherein said predetermined condition is set as to whether there is a vehicle running behind.

10. A navigation control system for an automotive vehicle as claimed in claim 9, wherein said predetermined condition is further set as to whether there is a lane in a direction in which the vehicle is deviating from the lane, said lane being for another vehicle running in the same direction; and said control means is set to operate said deviation suppressing means at a timing earlier when there is such a lane and there is the vehicle running behind than when there no such a vehicle running on such a lane.

11. A navigation control system for an automotive vehicle as claimed in claim 1, wherein said predetermined condition is set as to whether the lane on which the vehicle is currently running is curved or straight.

12. A navigation control system for an automotive vehicle as claimed in claim 11, wherein said control means is set to operate said deviation suppressing means at a timing earlier when the current lane is curved than when the current lane is straight.

13. A navigation control system for an automotive vehicle as claimed in claim 1, wherein said predetermined condition is set as to whether the vehicle is deviating from the curved lane towards its outside or towards its inside.

14. A navigation control system for an automotive vehicle as claimed in claim 13, wherein said control means is set to operate said deviation suppressing means at a timing earlier when the vehicle is deviating from the curved lane towards its outside than when the vehicle is deviating from the curved lane towards its inside.

15. A navigation control system for an automotive vehicle as claimed in claim 1, wherein said predetermined condition is set as a lane width of the lane.

16. A navigation control system for an automotive vehicle as claimed in claim 15, wherein said control means is set to operate said deviation suppressing means at a timing earlier when the lane width is wider than when the lane width is narrower.

17. A navigation control system for an automotive vehicle as claimed in claim 1, wherein said predetermined condition is a likelihood for the vehicle to deviate from the lane; and said control means operates said deviation suppressing means at a time which is earlier when the likelihood for the vehicle to deviate from the lane is higher.

18. A navigation control system for an automotive vehicle as claimed in claim 1, wherein said predetermined condition is a vehicle speed of the vehicle.

19. A navigation control system for an automotive vehicle as claimed in claim 18, wherein said control means is set to operate said deviation suppressing means at a time earlier than when the vehicle speed is higher than when the vehicle speed is lower.

20. A navigation control system for an automotive vehicle as claimed in claim 1, wherein said predetermined condition is set as a steering angle of the vehicle.

21. A navigation control system for an automotive vehicle as claimed in claim 20, wherein said control means is set to operate said deviation suppressing means at a time earlier than when the steering angle is larger than when the vehicle speed is smaller.

22. A navigation control system for an automotive vehicle as claimed in claim 1, wherein said predetermined condition is a degree of stability of navigation of the vehicle.

23. A navigation control system for an automotive vehicle as claimed in claim 22, wherein said control means is set to operate said deviation suppressing means at a time earlier when the degree of stability of navigation of the vehicle is higher than when the degree of stability of navigation of the vehicle is lower.

24. A navigation control system for an automotive vehicle as claimed in claim 23, wherein said stability of navigation of the vehicle is detected based on at least one of an acceleration or a deceleration in a longitudinal direction of the vehicle, an amount of an operation of an accelerator, an amount of an operation of a brake, an angle at which the vehicle is slipping in a transverse direction of the lane on which the vehicle is running, a yaw rate acting upon a body of the vehicle, a velocity at which a steering wheel is operatively rotated, a body weight of the body of the vehicle, a road surface friction coefficient, and a degree of roughness on a surface of the lane on which the vehicle is running.

25. A navigation control system for an automotive vehicle as claimed in claim 1, wherein said predetermined condition comprises an approach of the vehicle running in the lane to a second vehicle such that an impact between the vehicles is imminent; and said control means is set to operate said deviation suppressing means at an earlier time when the vehicle is approaching closer to another vehicle, than when the vehicle is farther from another vehicle.

26. A navigation control system for an automotive vehicle as claimed in claim 1, wherein said predetermined condition is a range of vision; and said control means is set to operate said deviation suppressing means at a time earlier when the range of vision is better than when the range of vision is poorer.

27. A navigation control system for an automotive vehicle as claimed in claim 26, wherein said control means is set to operate said deviation suppressing means at a timing earlier when the vehicle is running at a night time than when the vehicle is running during a day time.

28. A navigation control system for an automotive vehicle as claimed in claim 1, wherein said detection means comprises at least a camera or a radar, each being loaded on the vehicle.

29. A navigation control system for an automotive vehicle as claimed in claim 1, wherein said deviation suppressing means comprises a steering actuator for operating a steering wheel prior to an intention of an operator.

30. A navigation control system for an automotive vehicle as claimed in claim 1, wherein said deviation suppressing means comprises an alarm producing an alarm sound to an operator.

31. A navigation control system for an automotive vehicle as claimed in claim 1, wherein said deviation suppressing means includes means for operating when the vehicle is deviating from the lane by going beyond a predetermined threshold value preset for a left-hand or right-hand boundary line of the lane on which the vehicle is currently running.

32. A navigation control system for an automotive vehicle as claimed in claim 31, wherein:

a transversely estimated position of the vehicle in a transverse direction of the lane in a predetermined period of time is estimated on the basis of a transversely moving velocity of the vehicle and a predetermined computation coefficient; and said deviation suppressing means is so arranged as to be operated when the transversely estimated position of the vehicle has gone beyond a position corresponding to said threshold value or when the transversely estimated position of the vehicle is about to go beyond the position corresponding to said threshold value.

33. A navigation control system for an automotive vehicle as claimed in claim 31, wherein the timing of operating said deviation suppressing means is altered by said control means by changing the position corresponding to said threshold value.

34. A navigation control system for an automotive vehicle as claimed in claim 31, wherein the position corresponding to said threshold value is set as a position of the left-hand or right-hand boundary line of the lane on which the vehicle is currently running or as a position located inside by a predetermined distance in a transverse direction of the lane.

35. A navigation control system for an automotive vehicle as claimed in claim 31, wherein the timing of operating said deviation suppressing means is altered by said control means by changing a decision reference value to determine that the transversely estimated position of the vehicle has gone beyond a position corresponding to said threshold value or that the transversely estimated position of the vehicle is about to go beyond the position corresponding to said threshold value.

36. A navigation control system for an automotive vehicle as claimed in claim 32, wherein said control means is so adapted as to alter the timing of operating said deviation suppressing means by changing the computation coefficient.

37. A navigation control system for an automotive vehicle, which is running on a lane of road, comprising:

means for determining adjacent or opposite road lane conditions on the road different than the lane on which the vehicle is running;

means for setting predetermined control parameters for automatic vehicle steering control based on said adjacent or Opposite road lane conditions determined by said determining means, said control parameters varying with said adjacent or opposite road lane conditions;

means for detecting a predetermined state affecting deviation of the vehicle from the lane and comparing said predetermined State with said control parameters; and deviation suppressing means for suppressing the vehicle's deviation from the lane when the predetermined state affecting deviation exceeds a threshold associated with said predetermined state.

* * * * *